(12) United States Patent
Dods et al.

(10) Patent No.: US 12,470,415 B1
(45) Date of Patent: *Nov. 11, 2025

(54) ACCESS DELEGATION LEVERAGING PRIVATE KEYS ON KEYSTORES READ BY PROVISIONED DEVICES

(71) Applicant: LEDGERDOMAIN INC., Las Vegas, NV (US)

(72) Inventors: Victor Bovee Dods, Seattle, WA (US); Benjamin James Taylor, Las Vegas, NV (US); Benjamin Gregory Nichols, New Plymouth (NZ)

(73) Assignee: LEDGERDOMAIN INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,356

(22) Filed: Dec. 18, 2023

Related U.S. Application Data

(63) Continuation of application No. 17/982,518, filed on Nov. 7, 2022, now Pat. No. 11,848,754.

(51) Int. Cl.
*H04L 9/00* (2022.01)
*H04L 9/08* (2006.01)
*H04L 9/32* (2006.01)

(52) U.S. Cl.
CPC .............. *H04L 9/50* (2022.05); *H04L 9/0819* (2013.01); *H04L 9/0841* (2013.01); *H04L 9/321* (2013.01); *H04L 9/3297* (2013.01)

(58) Field of Classification Search
CPC ....... H04L 9/50; H04L 9/0819; H04L 9/0841; H04L 9/321; H04L 9/3297
See application file for complete search history.

(56) References Cited

U.S. PATENT DOCUMENTS 7,170,391 B2   1/2007  Lane et al.
9,870,508 B1   1/2018  Hodgson et al.
(Continued)

FOREIGN PATENT DOCUMENTS

CN   110597902 A      12/2019
WO   2018206408 A1   11/2018
(Continued)

OTHER PUBLICATIONS

Abid et al., Block-Chain Security Advancement in Medical Sector for sharing Medical Records, 2019 International Conference on Innovative Computing (ICIC) (Year: 2019).
(Continued)

*Primary Examiner* — Taghi T Arani
*Assistant Examiner* — Blake I Narramore
(74) *Attorney, Agent, or Firm* — Haynes Beffel & Wolfeld LLP; Paul A. Durdik

(57) ABSTRACT

The disclosed technology teaches a method for delegating user access to one of a set of decentralized networked nodes that share a private permissioned blockchain data structure or a decentralized personal ledger. The method also includes a credentialing logic configured to receive from one of a set of decentralized networked nodes, authority to access a network node to invoke services that conduct operations using a private permissioned blockchain data structure or decentralized personal ledger to which access has been limited to users authorized by one of the set of decentralized networked nodes; and an access delegation logic configured to create a delegation of at least some of the authority to access the network node for a limited duration of time and to send the delegation to a recipient identified to receive delegated authority.

21 Claims, 14 Drawing Sheets

(56) References Cited

U.S. PATENT DOCUMENTS

| | | | |
|---|---|---|---|
| 10,268,974 B2 | 4/2019 | Wiig et al. | |
| 10,356,087 B1 | 7/2019 | Vetter et al. | |
| 10,491,404 B1 | 11/2019 | Yamamoto | |
| 10,491,578 B1 | 11/2019 | Hebert et al. | |
| 10,496,802 B2 | 12/2019 | Weis | |
| 10,509,684 B2 | 12/2019 | Florissi et al. | |
| 10,516,525 B2 | 12/2019 | Bhattacharya et al. | |
| 10,540,704 B2 | 1/2020 | Mazed et al. | |
| 10,542,046 B2 | 1/2020 | Katragadda et al. | |
| 10,990,693 B1 | 4/2021 | Newman | |
| 11,468,046 B2 | 10/2022 | Conley et al. | |
| 11,509,709 B1* | 11/2022 | Basak | H04L 9/3297 |
| 11,736,290 B1 | 8/2023 | Dods et al. | |
| 11,741,215 B1 | 8/2023 | Dods et al. | |
| 11,741,216 B1 | 8/2023 | Dods et al. | |
| 11,769,577 B1 | 9/2023 | Dods et al. | |
| 11,829,510 B2 | 11/2023 | Dods et al. | |
| 11,848,754 B1 | 12/2023 | Dods et al. | |
| 2012/0130905 A1 | 5/2012 | Tsudik et al. | |
| 2014/0006048 A1 | 1/2014 | Liberty | |
| 2014/0025443 A1 | 1/2014 | Onischuk | |
| 2014/0040153 A1 | 2/2014 | Singh et al. | |
| 2014/0108043 A1 | 4/2014 | Ach et al. | |
| 2015/0039700 A1 | 2/2015 | West et al. | |
| 2015/0262171 A1 | 9/2015 | Langschaedel et al. | |
| 2015/0269379 A1 | 9/2015 | Ramzan et al. | |
| 2016/0125199 A1 | 5/2016 | Lee et al. | |
| 2016/0155069 A1 | 6/2016 | Hoover et al. | |
| 2016/0212146 A1 | 7/2016 | Wilson | |
| 2017/0103167 A1 | 4/2017 | Shah | |
| 2017/0221032 A1 | 8/2017 | Mazed | |
| 2017/0286880 A1 | 10/2017 | Wiig et al. | |
| 2017/0310653 A1 | 10/2017 | Zhang | |
| 2017/0337588 A1 | 11/2017 | Chittilappilly et al. | |
| 2018/0048461 A1 | 2/2018 | Jutla et al. | |
| 2018/0114169 A1 | 4/2018 | Wiig et al. | |
| 2018/0139186 A1 | 5/2018 | Castagna | |
| 2018/0341648 A1 | 11/2018 | Kakavand et al. | |
| 2019/0012249 A1 | 1/2019 | Mercuri et al. | |
| 2019/0020661 A1 | 1/2019 | Zhang | |
| 2019/0026450 A1 | 1/2019 | Egner et al. | |
| 2019/0051079 A1 | 2/2019 | Venkataraman et al. | |
| 2019/0052453 A1 | 2/2019 | de Ligt | |
| 2019/0057386 A1 | 2/2019 | Fazeli et al. | |
| 2019/0058599 A1 | 2/2019 | Takada Chino et al. | |
| 2019/0068562 A1 | 2/2019 | Iyer et al. | |
| 2019/0075102 A1 | 3/2019 | Kim et al. | |
| 2019/0108898 A1 | 4/2019 | Gulati | |
| 2019/0138905 A1 | 5/2019 | Akella et al. | |
| 2019/0138971 A1 | 5/2019 | Uggirala et al. | |
| 2019/0141119 A1 | 5/2019 | Bernat et al. | |
| 2019/0171438 A1 | 6/2019 | Franchitti | |
| 2019/0180276 A1 | 6/2019 | Lee et al. | |
| 2019/0222570 A1 | 7/2019 | Krishan | |
| 2019/0228174 A1 | 7/2019 | Withrow et al. | |
| 2019/0251295 A1 | 8/2019 | Vieyra | |
| 2019/0281066 A1 | 9/2019 | Simons | |
| 2019/0325507 A1 | 10/2019 | Rowley et al. | |
| 2019/0333116 A1 | 10/2019 | Bhardwaj et al. | |
| 2019/0334716 A1 | 10/2019 | Kocsis et al. | |
| 2019/0392162 A1 | 12/2019 | Stern et al. | |
| 2020/0005133 A1 | 1/2020 | Zhang et al. | |
| 2020/0013229 A1 | 1/2020 | Lee et al. | |
| 2020/0019288 A1 | 1/2020 | D'Amore et al. | |
| 2020/0084483 A1 | 3/2020 | Brown et al. | |
| 2020/0110821 A1 | 4/2020 | Chan et al. | |
| 2020/0118060 A1 | 4/2020 | Mukherjee et al. | |
| 2020/0137557 A1 | 4/2020 | Touati et al. | |
| 2020/0153606 A1 | 5/2020 | Li et al. | |
| 2020/0186358 A1 | 6/2020 | Capola et al. | |
| 2020/0213218 A1 | 7/2020 | Demeilliez et al. | |
| 2020/0219099 A1 | 7/2020 | Mohassel et al. | |
| 2020/0252205 A1 | 8/2020 | Padmanabhan | |
| 2020/0258166 A1 | 8/2020 | Cross et al. | |
| 2020/0265031 A1 | 8/2020 | Greven | |
| 2020/0268260 A1 | 8/2020 | Tran | |
| 2020/0294033 A1 | 9/2020 | Wilson et al. | |
| 2020/0320207 A1 | 10/2020 | Beno et al. | |
| 2020/0322169 A1 | 10/2020 | Michaud et al. | |
| 2020/0374137 A1 | 11/2020 | Godfrey | |
| 2020/0374145 A1 | 11/2020 | Kau et al. | |
| 2020/0389499 A1 | 12/2020 | Koval et al. | |
| 2020/0403809 A1 | 12/2020 | Chan et al. | |
| 2020/0403810 A1* | 12/2020 | Murdoch | H04L 67/10 |
| 2021/0034779 A1 | 2/2021 | Signorini et al. | |
| 2021/0126769 A1* | 4/2021 | Soundararajan | H04L 63/10 |
| 2021/0126797 A1* | 4/2021 | Peng | H04L 9/3239 |
| 2021/0136068 A1 | 5/2021 | Smeets et al. | |
| 2021/0150205 A1 | 5/2021 | Snyder et al. | |
| 2021/0158309 A1 | 5/2021 | McGinlay et al. | |
| 2021/0174914 A1* | 6/2021 | Cano | G16H 10/60 |
| 2021/0182539 A1 | 6/2021 | Rassool | |
| 2021/0208960 A1 | 7/2021 | Dande et al. | |
| 2021/0218720 A1 | 7/2021 | Oberhauser et al. | |
| 2021/0234672 A1 | 7/2021 | Zeng et al. | |
| 2021/0264520 A1 | 8/2021 | Cummings | |
| 2022/0051240 A1 | 2/2022 | Shamai et al. | |
| 2022/0051314 A1 | 2/2022 | Enkhtaivan | |
| 2022/0052988 A1 | 2/2022 | Gadnis et al. | |
| 2022/0083936 A1 | 3/2022 | Balinsky et al. | |
| 2022/0150077 A1 | 5/2022 | Kim | |
| 2022/0179378 A1 | 6/2022 | Gourisetti et al. | |
| 2022/0405750 A1* | 12/2022 | Fallah | H04L 9/14 |
| 2022/0407856 A1* | 12/2022 | Jawed | G06F 21/33 |
| 2022/0414237 A1 | 12/2022 | Lally et al. | |
| 2022/0417331 A1* | 12/2022 | Devine | H04L 67/306 |
| 2023/0006845 A1* | 1/2023 | Leedom, Jr. | H04L 9/3297 |

FOREIGN PATENT DOCUMENTS

| | | | |
|---|---|---|---|
| WO | 2019086553 A1 | 5/2019 | |
| WO | 2019090264 A1 | 5/2019 | |
| WO | 2019090268 A1 | 5/2019 | |
| WO | 2019207297 A1 | 10/2019 | |
| WO | 2020006121 A1 | 1/2020 | |
| WO | 2021127577 A1 | 6/2021 | |

OTHER PUBLICATIONS

Androulaki et. al., Hyperledger Fabric: A distributed operating system for permissioned blockchains, Proceedings for EuroSys 2018 Conference, revised Apr. 17, 2018, 15 pages. Retrieved on Oct. 2, 2021. Retrieved from the internet [URL: https://arxiv.org/abs/1801.10228 ].

Ashkar et. al., Evaluation of Decentralized Verifiable Credentials to Authenticate Authorized Trading Partners and Verify Drug Provenance, Blockchain for Healthcare Today, dated Mar. 11, 2021, 14 pages. Retrieved on Oct. 3, 2021. Retrieved from the internet [URL: https://blockchainhealthcaretoday.com/index.php/journal/article/view/168 ].

Bogdanov, Pseudorandom Functions: Three Decades Later, dated 2017, 72 pages. Retrieved on Oct. 6, 2021. Retrieved from the internet [URL: https://eprint.iacr.org/2017/652.pdf].

Bossert, I Was the Homeland Security Adviser to Trump. We're Being Hacked., The New York Times, dated Dec. 16, 2020, 3 pages. Retrieved on Oct. 3, 2021. Retrieved from the internet [URL: https://www.nytimes.com/2020/12/16/opinion/fireeye-solarwinds-russia-hack.html ].

Bourque, Ditching passwords and increasing e-commerce conversion rates by 54%, CIO, dated May 1, 2017, 4 pages. Retrieved on Oct. 2, 2021. Retrieved from the internet [URL: https://www.cio.com/article/3193206/ditching-passwords-and-increasing-ecommerce-conversion-rates-by-54.html ].

Brook, "What's the Cost of a Data Breach in 2019?", Data Insider-Digital Guardian, dated Dec. 1, 2020, 8 pages. Retrieved on Oct. 2, 2021. Retrieved from the internet [URL: https://digitalguardian.com/blog/whats-cost-data-breach-2019 ].

Callahan et. al., Six Principles for Self-Sovereign Biometrics, Web of Trust Info., GitHub, dated Oct. 6, 2019, 7 pages. Retrieved on Oct.

(56) References Cited

OTHER PUBLICATIONS 5, 2021. Retrieved from the internet [URL: https://github.com/WebOfTrustInfo/rwot6-santabarbara/blob/master/draft-documents/Biometrics.md].
Callahan, Council Post: Know Your Customer (KYC) Will Be a Great Thing When It Works, Forbes, dated Jul. 10, 2018, 8 pages. Retrieved on Oct. 1, 2021. Retrieved from [URL: https://www.forbes.com/sites/forbestechcouncil/2018/07/10/know-your-customer-kyc-will-be-a-great-thing-when-it-works/?sh=722a21178dbb ].
Chadwick et. al., Verifiable Credentials Data Model 1.0: Expressing verifiable information on the Web, World Wide Web Consortium (W3C), dated Nov. 19, 2019, 68 pages. Retrieved on Oct. 1, 2021. Retrieved from the internet [URL: https://www.w3.org/TR/vc-data-model/ ].
Chien et. al., The Last Mile: DSCSA Solution Through Blockchain Technology: Drug Tracking, Tracing and Verification at the Last Mile of the Pharmaceutical Supply Chain with BRUINchain, Blockchain in Healthcare Today, dated Mar. 12, 2020, 28 pages. Retrieved on Oct. 2, 2021. Retrieved from the internet [URL: https://blockchainhealthcaretoday.com/index.php/journal/article/view/134 ].
COVID-19 Credentials Initiative, Hello World from the COVID-19 Credentials Initiative, dated Jun. 25, 2020, 3 pages. Retrieved on Oct. 3, 2021. Retrieved from the internet [URL: https://cci-2020.medium.com/hello-world-from-the-covid-19-credentials-initiative-6d45534c4b3a ].
DIF—Decentralized Identity Foundation, Homepage, dated 2021, 8 pages. Retrieved on Oct. 6, 2021. Retrieved from the internet [URL: https://identity.foundation/ ].
Dodds, Follow Your Nose, Linked Data Patterns, dated May 31, 2012, 2 pages. Retrieved on Oct. 3, 2021. Retrieved from the internet [URL: https://patterns.dataincubator.org/book/follow-your-nose.html ].
Drug Supply Chain Security Act (DSCSA), Food and Drug Administration (FDA), retrieved on Oct. 1, 2021, 3 pages. Retrieved from [URL: https://www.fda.gov/drugs/drug-supply-chain-integrity/drug-supply-chain-security-act-dscsa ].
DSCSA Pilot Project Program, Food and Drug Administration (FDA), updated May 22, 2019, 4 pages. Retrieved on Oct. 2, 2021. Retrieved from the internet [URL: https://www.fda.gov/drugs/drug-supply-chain-security-act-dscsa/dscsa-pilot-project-program ].
Entities, Spherity, 3 pages. Retrieved on Oct. 3, 2021. Retrieved from the internet [URL: https://docs.spherity.com/spherity-api/verifiable-credentials-api/entities ].
FDA's Technology Modernization Action Plan (TMAP), Food and Drug Administration (FDA), dated Sep. 18, 2019, 10 pages. Retrieved on Oct. 3, 2021. Retrieved from the internet [URL: https://www.fda.gov/media/130883/download].
Federal Trade Commission, Federal Law Requires All Businesses to Truncate Credit Card Information on Receipts, Federal Trade Commission (FTC), dated May 2007, 3 pages. Retrieved on Oct. 2, 2021. Retrieved from the internet [URL: https://www.ftc.gov/tips-advice/business-center/guidance/slip-showing-federal-law-requires-all-businesses-truncate ].
Freisleben, VRS Updates: Past, Present and Future, dated Dec. 12, 2018, Healthcare Distribution Alliance (HDA) 6 pages. Retrieved on Oct. 1, 2021. Retrieved from the internet [URL: https://www.hda.org/news/hda-blog/2018/12/07/14/44/2018-12-12-vrs-update-past-present-future ].
Gabay, Federal Controlled Substances Act: Ordering and Recordkeeping, Hospital Pharmacy, dated Dec. 9, 2013, 3 pages. Retrieved on Oct. 2, 2021. Retrieved from the internet [URL: https://www.ncbi.nlm.nih.gov/pmc/articles/PMC3875106/].
General Meeting Agenda—Healthcare SIG, Hyperledger Foundation, updated Feb. 17, 2021, 2 pages. Retrieved on Oct. 3, 2021. Retrieved from the internet [URL: https://wiki.hyperledger.org/display/HCSIG/2021.02.17+General+Meeting+Agenda ].
Google Protocol Buffers—Google's data interchange format, Github, dated 2008, 6 pages. Retrieved on Oct. 3, 2021. Retrieved from the internet [URL: https://github.com/protocolbuffers/protobuf].

Grassi et al., NIST Special Publication 800-63C, Digital Identity Guidelines-Federation and Assertions, retrieved on Oct. 1, 2021, 48 pages. Retrieved from [ URL: https://pages.nist.gov/800-63-3/sp800-63c.html ].
Grassi et. al., Digital Identity Guidelines, NIST Special Publication 800-63-3, dated Jun. 2017, 75 pages. Retrieved on Oct. 6, 2021. Retrieved from the internet [URL: https://doi.org/10.6028/NIST.SP.800-63-3 ].
Grassi et. al., Digital Identity Guidelines: Authentication and Lifecycle Management, NIST Special Publication 800-63B, dated Jun. 2017, 79 pages. Retrieved on Oct. 6, 2021. Retrieved from the internet [URL: https://doi.org/10.6028/NIST.SP.800-63b ].
Grassi et. al., Digital Identity Guidelines: Federation and Assertions, NIST Special Publication 800-63C, dated Jun. 2017, 49 pages. Retrieved on Oct. 6, 2021. Retrieved from the internet [URL: https://doi.org/10.6028/NIST.SP.800-63c ].
GS1 Healthcare U.S. Standard 1.1—Applying the GS1 Lightweight Messaging Standard for DSCSA Verification of Returned Product Identifiers, dated Mar. 31, 2020, 60 pages. Retrieved on Oct. 1, 2021. Retrieved from the Internet [URL: https://www.gs1us.org/DesktopModules/Bring2mind/DMX/Download.aspx?Command=Core_Download&EntryId=1897&language=en-US&PortalId=0&TabId=134 ].
GS1 Healthcare U.S., Assessing Current Implementation of DSCSA Serialization Requirements, GS1 US, dated 2018, 6 pages. Retrieved on Oct. 2, 2021. Retrieved from the internet [URL: https://www.gs1us.org/DesktopModules/Bring2mind/DMX/Download.aspx?Command=Core_Download&EntryId=1210&language=en-US&PortalId=0&TabId=134 ].
GS1 Healthcare U.S., GS1 Lightweight Messaging Standard for Verification of Product Identifiers, dated Dec. 2018, 30 pages. Retrieved on Oct. 2, 2021. Retrieved from the internet [URL: https://www.gs1.org/docs/epc/GS1_Lightweight_Verification_Messaging_Standard.pdf ].
GS1 Healthcare U.S., Standard 1.2, Applying GS1 Standards for DSCSA and Traceability, dated Nov. 7, 2016, 126 pages. Retreived on Oct. 2, 2021. Retrieved from the internet [URL: https://www.gs1us.org/DesktopModules/Bring2mind/DMX/Download.aspx?Command=Core_Download&EntryId=749&language=en-US&PortalId=0&TabId=134 ].
GS1 Standards Resources for DSCSA Implementation Support, GS1 US, dated Feb. 22, 2021, 7 pages. Retrieved on Oct. 3, 2021. Retrieved from the internet [URL: https://www.gs1us.org/industries/healthcare/standards-in-use/pharmaceutical/dscsa-resources ].
GS1 U.S., DSCSA Pilot Project readiness results, PDG FDA Pilot Program Round-Robin Webinar Series, dated Jun. 30, 2020, slides 16-29. Retrieved on Oct. 2, 2021. Retreived from the internet [URL: : https://dscsagovernance.org/wp-content/uploads/2020/08/Attachment-A-Presentations. pdf ].
Hammi, M.T. et al., Apr. 2018. "BCTrust: A decentralized authentication blockchain-based mechanism". In 2018 IEEE wireless communications and networking conference (WCNC) (pp. 1-6). IEEE. (Year: 2018), in 6 pages.
Hardman, Verifiable Data Registry (Image), Wikipedia, dated Nov. 5, 2019, 1 page. Retrieved on Oct. 6, 2021. Retrieved from the internet [URL: https://en.wikipedia.org/wiki/Verifiable_credentials#/media/File:VC_triangle_of_Trust.svg ].
HDA Saleable Returns Pilot Study Identifies Two Recommendations to Meet 2019 DSCSA Requirements, Healthcare Distribution Alliance (HDA), dated Nov. 10, 2016, 5 pages. Retrieved on Oct. 3, 2021. Retrieved from the internet [URL: https://www.hda.org/news/2016-11-10-hda-pilot-results-revealed ].
Heath, SolarWinds hack was 'largest and most sophisticated attack' ever-Microsoft president, Financial Post, dated Feb. 14, 2021, 3 pages. Retrieved on Oct. 3, 2021. Retrieved from the internet [URL: https://financialpost.com/pmn/business-pmn/solarwinds-hack-was-largest-and-most-sophisticated-attack-ever-microsoft-president ].
Housley et. al., Trust Anchor Format, Internet Engineering Task Force (IETF), dated Jun. 2021, 14 pages. Retrieved on Oct. 3, 2021. Retrieved from the internet [URL: https://datatracker.ietf.org/doc/html/rfc5914 ].

(56) References Cited

OTHER PUBLICATIONS

How to share an OpenPGP public key easily in three steps, Mailfence, dated Jul. 11, 2017, 14 pages. Retrieved on Aug. 13, 2021. Retrieved from the internet [URL: https://blog.mailfence.com/openpgp-public-key/ ].

Hyperledger, Ursa, Github, updated 2021, 7 pages. Retrieved on Oct. 3, 2021. Retrieved from the internet [URL: https://github.com/hyperledger/ursa ].

Identity-concept.svg, Wikimedia Commons, 3 pages. Retrieved on Oct. 6, 2021. Retrieved from the internet [URL: https://commons.wikimedia.org/wiki/File:Identity-concept.svg ].

Jurgens, Industry-wide DSCSA Compliance Pilot Successfully Completed, Spherity, dated Dec. 17, 2020, 15 pages. Retrieved on Oct. 1, 2021. Retrieved from the internet [URL: https://medium.com/spherity/industry-wide-dscsa-compliance-pilot-successfully-completed-d7223a0f2c92 ].

Kaptjin et. al., X.509 DID method, WebOfTrustInfo, GitHub, dated Aug. 12, 2019, 6 pages. Retrieved on Oct. 5, 2021. Retrieved from the internet [URL: https://github.com/WebOfTrustInfo/rwot9-prague/blob/master/topics-and-advance-readings/X.509-DID-Method.md ].

Keen et al., Forecasts Worldwide Information Security Spending to Exceed $124 Billion in 2019, Gartner, dated Aug. 15, 2018, 5 pages. Retrieved on Oct. 2, 2021. Retrieved from the internet [URL: https://www.gartner.com/en/newsroom/press-releases/2018-08-15-gartner-forecasts-worldwide-information-security-spending-to-exceed-124-billion-in-2019 ].

Krebs, at Least 30,000 U.S. Organizations Newly Hacked via Holes in Microsoft's Email, Krebson Security, dated Mar. 5, 2021, 6 pages. Retrieved on Oct. 3, 2021. Retrieved from the internet. [URL: https://krebsonsecurity.com/2021/03/at-least-30000-u-s-organizations-newly-hacked-via-holes-in-microsofts-email-software/ ].

Lodder et. al., Sovrin DID Method Specification, Sovrin Foundation, dated Aug. 20, 2021, 16 pages. Retrieved on Oct. 3, 2021. Retrieved from the internet [URL: https://sovrin-foundation.github.io/sovrin/spec/did-method-spec-template.html ].

Looker et. al., BBS+ Signatures 2020 Draft Community Group Report, W3C Community Group, dated Jun. 13, 2021, 31 pages. Retrieved on Oct. 3, 2021. Retrieved from the internet [URL: https://w3c-ccg.github.io/ldp-bbs2020/ ].

Lu, "How Much are Password Resets Costing Your Company?", Okta, dated Aug. 20, 2021, 2 pages. Retrieved on Oct. 2, 2021. Retrieved from the internet [URL: https://www.okta.com/blog/2019/08/how-much-are-password-resets-costing-your-company/ ].

Makaay et. al., Frameworks for Identity Systems, Open Identity Exchange (OIX), dated Jun. 2017, 18 pages. Retrieved on Oct. 5, 2021. Retrieved from the internet [URL: https://connectis.com/wp-content/uploads/2018/05/OIX-White-Paper_Trust-Frameworks-for-Identity-Systems_Final.pdf ].

Matney, Apple's global active install base of iPhones surpassed 900 million this quarter, TechCrunch, dated Jan. 29, 2019, 2 pages. Retrieved on Oct. 2, 2021. Retrieved from the internet [URL: https://techcrunch.com/2019/01/29/apples-global-active-install-base-of-iphones-surpassed-900-million-this-quarter/].

U.S. Appl. No. 17/492,488, filed Oct. 1, 2021, U.S. Pat. No. 11,769,577, Sep. 26, 2023, Issued.

U.S. Appl. No. 18/372,029, filed Sep. 22, 2023, Pending.

U.S. Appl. No. 18/372,037, filed Sep. 22, 2023, Pending.

U.S. Appl. No. 18/239,061, filed Aug. 28, 2023, Allowed.

U.S. Appl. No. 18/236,361, filed Aug. 21, 2023, Pending.

U.S. Appl. No. 18/239,088, filed Aug. 28, 2023, Allowed.

U.S. Appl. No. 18/234,293, filed Aug. 15, 2023, Allowed.

UCLA Health, "UCLA-LedgerDomain: DSCSA Solution through Blockchain Technology: Drug Tracking, Tracing and Verification at the Last Mile of the Pharmaceutical Supply Cain with BRUINchain", PDG FDA Pilot Program Round Robin, Jul. 2020, in 160 pages.

Mitre, Broad Coalition of Health and Technology Industry Leaders Announce Vaccination Credential Initiative to Accelerate Digital Access to COVID-19 Vaccination Records, dated Jan. 14, 2021, 5 pages. Retrieved on Oct. 3, 2021. Retrieved from the internet [URL: https://www.businesswire.com/news/home/20210114005294/en/Broad-Coalition-of-Health-and-Technology-Industry-Leaders-Announce-Vaccination-Credential-Initiative-to-Accelerate-Digital-Access-to-COVID-19-Vaccination-Records ].

Newton, The battle inside Signal, The Verge, dated Jan. 25, 2021, 19 pages. Retrieved on Oct. 3, 2021. Retrieved from the internet. [URL: https://www.theverge.com/platform/amp/22249391/signal-app-abuse-messaging-employees-violence-misinformation ].

Object Management Group Issues Request for Information for Disposable Self-Sovereign Identity Standard, Object Management Group (OMG), dated Jan. 21, 2021, 3 pages. Retrieved on Oct. 3, 2021. Retrieved from the internet [URL: https://www.omg.org/news/releases/pr2021/01-21-21.htm ].

Otto et. al., Verifiable Credentials Use Cases, W3C Working Group, dated Sep. 24, 2019, 35 pages. Retrieved on Oct. 3, 2021. Retrieved from the internet [URL: https://www.w3.org/TR/vc-use-cases/ ].

Partnership for DSCSA Governance, PDG, 2021, 3 pages. Retrieved on Oct. 3, 2021. Retrieved from the internet [URL: https://dscsagovernance.org/ ].

PharmaCompass, Top 1000 Global Pharmaceutical Companies, LePro PharmaCompass OPC, dated Sep. 2020, 101 pages. Retrieved on Oct. 6, 2021. Retrieved from the internet [URL: https://www.pharmacompass.com/data-compilation/top-1000-global-pharmaceutical-companies ].

Ponemon, What's New in the 2019 Cost of a Data Breach Report, Security Intelligence, dated Jul. 23, 2019, 10 pages. Retrieved on Oct. 2, 2021. Retrieved from the internet [URL: https://securityintelligence.com/posts/whats-new-in-the-2019-cost-of-a-data-breach-report/ ].

Prabha, P. et al., Dec. 2020. Securing telecare medical information system with blockchain technology. In 2020 2nd International Conference on Advances in Computing, Communication Control and Networking (ICACCCN) (pp. 846-851). IEEE. (Year: 2020), in 6 pages.

Rahman et al., Blockchain Based Mobile Edge Computing Framework for Secure Therapy Applications, 2018, IEEE Special Section on Mobile Multimedia for Healthcare, vol. 6, pp. 72469-72478 (Year: 2018).

Reed et. al., What are Decentralized Identifiers (DIDs)?, Evernym on Slideshare, dated Sep. 30, 2019, 29 pages. Retrieved on Oct. 3, 2021. Retrieved from the internet [URL: https://www.slideshare.net/Evernym/what-are-decentralized-identifiers-dids ].

Rose et. al., Zero Trust Architecture, NIST Special Publication 800-207, dated Aug. 2020, 59 pages. Retrieved on Oct. 6, 2021. Retrieved from the internet [URL: https://csrc.nist.gov/publications/detail/sp/800-207/final ].

Rossberg, WebAssembly Core Specification, W3C Working Group, W3C, dated Dec. 5, 2019, 164 pages. Retrieved on Oct. 5, 2021. Retrieved from the internet [URL: https://www.w3.org/TR/wasm-core-1/ ].

Searls, New Hope for Digital Identity, Linux Journal, dated Nov. 9, 2017, 7 pages. Retrieved on Oct. 4, 2021. Retrieved from the internet [URL: https://www.linuxjournal.com/content/new-hope-digital-identity ].

Shuaib et al., Blockchains for Secure Digitized Medicine, Journal of Personalized Medicine, dated Jul. 13, 2019, 9 (3):35, 21 pages. Retrieved on Oct. 2, 2021. Retrieved from the internet [URL: https://www.mdpi.com/2075-4426/9/3/35 ].

Sovrin Governance Framework Working Group, Sovrin Governance Framework V2, Sovrin Foundation, dated Dec. 4, 2019, 20 pages. Retrieved on Oct. 5, 2021. Retrieved from the internet [URL: https://sovrin.org/wp-content/uploads/Sovrin-Governance-Framework-V2-Master-Document-V2.pdf ].

Sporny et. al., Verifiable Credentials Data Model 1.0, W3C Working Group, dated Nov. 19, 2019, 122 pages. Retrieved on Oct. 3, 2021. Retrieved from the internet [URL: https://www.w3.org/TR/vc-data-model/ ].

StClair et. al., Blockchain, Interoperability, and Self-Sovereign Identity: Trust Me, It's My Data, Blockchain in Healthcare Today, dated Jan. 6, 2020, 3 pages. Retrieved on Oct. 3, 2021. Retrieved from the internet [URL: https://blockchainhealthcaretoday.com/index.php/journal/article/view/122/144 ].

(56) References Cited

OTHER PUBLICATIONS

Steel, Passwords Are Still a Problem According to the 2019 Verizon Data Breach Investigations Report, LastPass Blog, dated May 21, 2019, 4 pages. Retrieved on Oct. 2, 2021. Retrieved from the internet [URL: https://blog. lastpass.com/2019/05/passwords-still-problem-according-2019-verizon-data-breach-investigations-report/ ].

Temoshok et. al., Developing Trust Frameworks to Support Identity Federations, National Institute of Standards and Technology (NIST), dated Jan. 2018, 34 pages. Retrieved on Oct. 4, 2021. Retrieved from the internet [URL: http://dx.doi.org/10.6028/NIST.IR.8149].

Thayer, "Why Does Mozilla Maintain Our Own Root Certificate Store?", Mozilla Security Blog, dated Feb. 14, 2019, 3 pages. Retrieved on Oct. 3, 2021. Retrieved from the internet [URL: https://blog.mozilla.org/security/2019/02/14/why-does-mozilla-maintain-our-own-root-certificate-store/ ].

The Commons project, Unlocking the full potential of technology and data for the common good, 2019-2021, 5 pages. Retrieved on Oct. 3, 2021. Retrieved from the internet [URL: https://thecommonsproject.org/commonpass ].

Tobin et. al., The Inevitable Rise of Self-Sovereign Identity, Sovrin Foundation Whitepaper, updated Mar. 28, 2017, 24 pages. Retrieved on Oct. 3, 2021. Retrieved from the internet [URL: https://sovrin.org/wp-content/uploads/2018/03/The-Inevitable-Rise-of-Self-Sovereign-Identity.pdf ].

U.S. Department of Health and Human Services Food and Drug Administration, Identifying Trading Partners Under the Drug Supply Chain Security Act: Guidance for Industry-Draft Guidance, Aug. 2017, 18 pages. Retrieved on Oct. 1, 2021. Retrieved from the internet [URL: https://www.fda.gov/files/drugs/published/Identifying-Trading-Partners-Under-the-Drug-Supply-Chain-Security-Act-Guidance-for-Industry.pdf ].

U.S. Department of Health and Human Services Food and Drug Administration, Verification Systems Under the Drug Supply Chain Security Act for Certain Prescription Drugs, Guidance for Industry, Draft Guidance, dated Oct. 2018, 14 pages. Retrieved on Oct. 2, 2021. Retrieved from the internet [URL: https://www.fda.gov/media/117950/download ].

U.S. Department of Health and Human Services Food and Drug Administration, Wholesale Distributor Verification Requirement for Saleable Returned Drug Product and Dispenser Verification Requirements When Investigating a Suspect or Illegitimate Product—Compliance Policies, Guidance for Industry, dated Oct. 2020, 10 pages. Retrieved on Oct. 2, 2021. Retrieved from the internet [URL: https://www.fda.gov/media/131005/download ].

U.S. Food and Drug Administration, Drug Supply Chain Security Act Law and Policies, U.S. Department of Health and Human Services Food and Drug Administration, updated Oct. 23, 2020, 6 pages. Retrieved on Oct. 1, 2021. Retrieved from the internet [URL: https://www.fda.gov/drugs/drug-supply-chain-security-act-dscsa/drug-supply-chain-security-act-law-and-policies].

Untitled code sample, W3C Working Group, W3C, dated 2018, 7 pages. Retrieved on Oct. 6, 2021. Retrieved from the internet [URL: https://www.w3.org/2018/credentials/v1 ].

Web Assembly, Mozilla Developer Network (MDN), dated 2021, 31 pages. Retrieved on Oct. 5, 2021. Retrieved from the internet [URL: https://developer.mozilla.org/en-US/docs/WebAssembly ].

What are SMART Health Cards?, SMART Health Cards Framework, 2021, 4 pages. Retrieved on Oct. 3, 2021. Retrieved from the internet [URL: https://smarthealth.cards/ ].

XATP Working Group, Framework for extended ATP Authentication, Enhanced Verification and Saleable Returns Documentation, LedgerDomain, dated Dec. 17, 2020, 25 pages. Retrieved on Oct. 1, 2021. Retrieved from the internet [URL: https://www.xatp.org/publications ].

Young, Verifiable Credentials Flavors Explained, COVID-19 Credentials Initiative, dated Feb. 2021, 21 pages. Retrieved on Oct. 3, 2021. Retrieved from the internet [URL: https://www.Ifph.io/wp-content/uploads/2021/02/Verifiable-Credentials-Flavors-Explained.pdf].

* cited by examiner

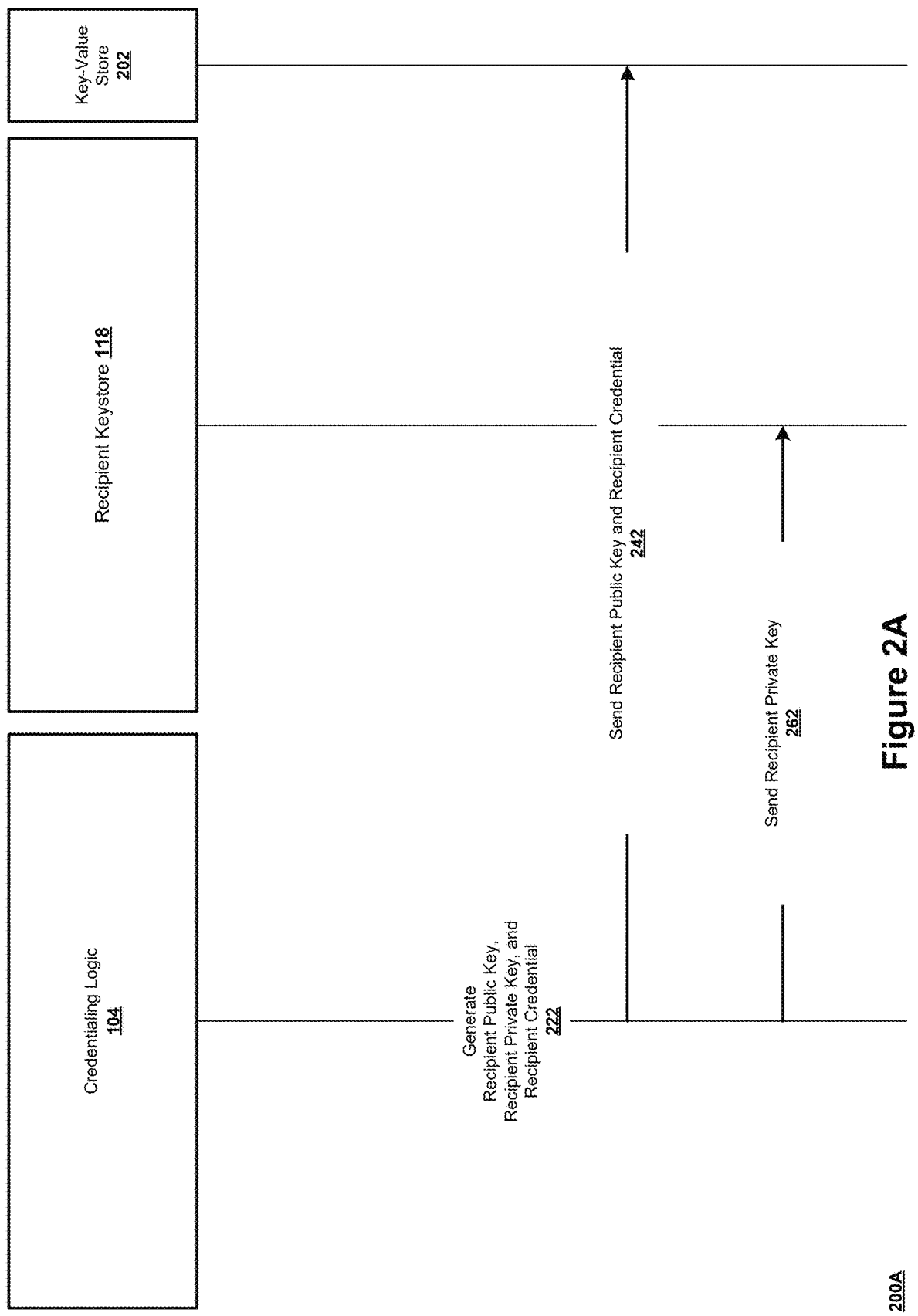

1. Conditional Access Definition 310

2. Access Credential Generation 320

3. Access Credential Encryption 330

4. Access Credential Deployment 340

1. Recipient Private Key Exchange 350

2. Recipient Public Key Generation 360

3. Access Credential Retrieval 370

4. Access Credential Decryption 380

5. Recipient Authentication 390

ACCESS DELEGATION LEVERAGING PRIVATE KEYS ON KEYSTORES READ BY PROVISIONED DEVICES

PRIORITY APPLICATION

This application is a continuation of U.S. Non-Provisional application Ser. No. 17/982,518, titled "ACCESS DELEGATION LEVERAGING PRIVATE KEYS ON KEYSTORES READ BY PROVISIONED DEVICES", filed Nov. 7, 2022, which is incorporated herein by reference in its entirety for all purposes.

INCORPORATIONS

This application is related to the following applications which are incorporated by reference herein for all purposes:

U.S. patent application Ser. No. 17/492,488, titled "DECENTRALIZED IDENTITY AUTHENTICATION FRAMEWORK FOR DISTRIBUTED DATA," filed Oct. 1, 2021.

U.S. patent application Ser. No. 18/372,029, titled "DECENTRALIZED IDENTITY AUTHENTICATION FRAMEWORK FOR DISTRIBUTED DATA," filed Sep. 22, 2023.

U.S. patent application Ser. No. 18/372,037, titled "DECENTRALIZED IDENTITY AUTHENTICATION FRAMEWORK FOR DISTRIBUTED DATA," filed Sep. 22, 2023.

FIELD OF INVENTION

The technology disclosed relates generally to decentralized identity authentication and management in a network of computers and corresponding data processing methods and products implementing secure authentication of users and user credential claims for access to a distributed, permissioned data structure shareable among disparate enterprises. In particular, the technology disclosed relates to using security software technology to implement authentication and credentialing by a trusted party of a non-credentialed user, enabling controlled access to secure permissioned blockchain data distributed among disparate enterprise actors.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Contemporary mobile devices (e.g., smartphones, tablet computers, and wearable devices such as smartwatches, and integrated circuit cards) have incorporated significant advancements in sensing technologies such as camera quality, geolocation sensing, and biometric authentication. Sensing technologies within recent generations of mobile devices are frequently comparable in functionality to those of industry-standard devices used by an enterprise (such as a business, company, firm, venture, partnership, and many other collaborative entities) in operations ranging from supply chain management and employee training to point-of-sale transactions. The use of mobile devices for business operations is advantageous due to the familiarity of these devices to workers of diverse backgrounds and skill levels.

With great power comes great responsibility; as well as great potential for chaos. Workers are known for sharing passwords without authorization, and the problem compounds when devices can be shared with other workers. Further, the rise of the "gig" economy has created a new segment of the workforce-those with a "loose affiliation" to an enterprise or multiple, potentially competing, enterprises.

An opportunity arises for improving the provisioning of devices for use in the workplace, and controlling the delegation of access credentials granted to users of these provisioned devices.

BRIEF DESCRIPTION OF DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 2A shows a message flow diagram for the provisioning of user credentials.

DETAILED DESCRIPTION

Figure 1A:
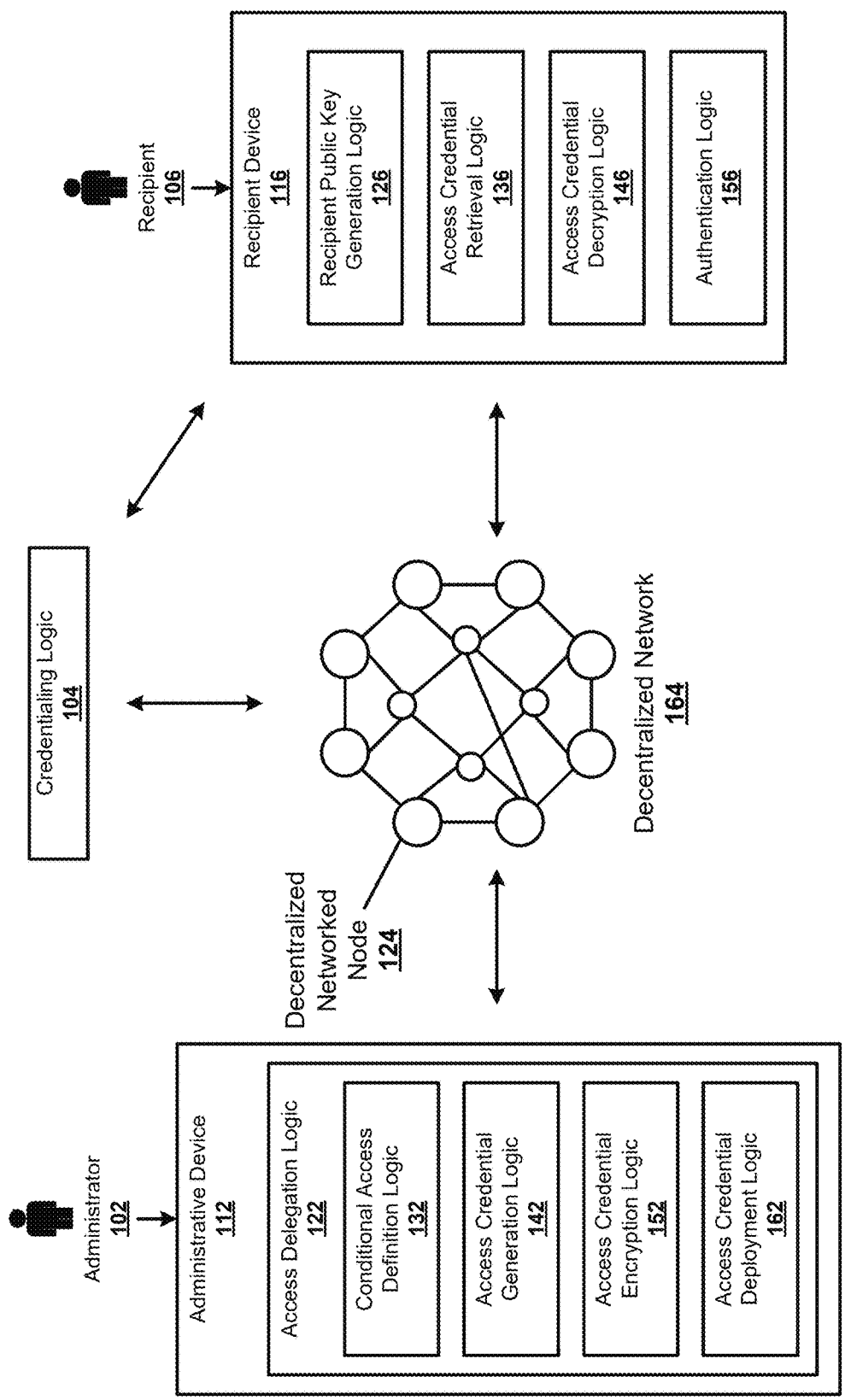
FIG. 1A shows an architectural level diagram of a system for access delegation leveraging private keys on single-tenant provisioned devices.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

INTRODUCTION

In identity and access management (IAM) systems, identity can be established through workflows encompassing application, review, and provisioning. However, access management represents a different challenge. Enterprises may provision administrators with the ability to define user roles and access privileges, but this approach can create significant bottlenecks and review overhead. In many cases, a centralized IAM system may be insufficiently flexible or efficient to accommodate the needs of individuals within an enterprise. An administrator may wish to give an individual temporary or limited access to certain privileges without waiting for a third-person administrator to approve or sharing all of their user information and access with the individual (or with a third-party administrator). While the individual may be acting on the administrator's behalf, the actions must be logged and tracked separately with a high degree of certainty which person performed each particular action.

Many centralized systems (e.g., cloud-based file storage solutions) accommodate this requirement by allowing users to invite other users to access shared resources. However, this still requires that credentialing and access are centrally managed, and often leverages email-based communications, particularly when the two users are not part of the same organization. This creates a point of failure that is highly vulnerable to compromise by bad actors.

Moreover, mobile devices have also made possible the introduction of new cryptographic capabilities that enable users to retain their own private keys locally rather than in cloud storage. In contrast to retaining private keys in cloud-based repositories, locally-sequestered private keys prevent a single party from having comprehensive access to an enterprise's identity and access management (IAM) framework. Hence, in the event that enterprise servers are breached, attackers are unable to impersonate existing users, as they would not have access to any user private keys. Provisioning of so-called self-sovereign credentials (e.g., one under custody and stewardship of a user) and delegation of access privileges leveraging private keys on uniquely identifiable devices provides efficacious IAM solutions for a variety of enterprises such as healthcare organizations, financial institutions, and non-profit organizations. For example, in the pharmaceutical supply chain, access management and auditability requirements demand that each interaction with privileged systems must be traceable to a single individual user.

Provisioning of self-sovereign credentials and delegation of access privileges can leverage smart contracts in such a way that private key information is never communicated. Decryption for the purpose of authentication of a user is only carried out on a uniquely identifiable device associated with the user, wherein the user-associated device comprises a locally stored user private key. Secure communication for the purpose of access privilege delegation is achieved through the use of a lookup directory or close-range communication between provisioned devices.

The disclosed system comprises an implementation for leveraging self-sovereign credentials held on mobile devices to generate smart contracts that empower one party ("recipient" or "user", used synonymously herein) to obtain credentialed access to information and resources on behalf of another party ("sender" or "administrator", used synonymously herein), without either party exposing private key information to each other or to the cloud. The sender is able to revoke access at any time. The recipient can, under the terms of the smart contract, in some situations delegate some of their access privileges to a second recipient. Revocation of a recipient's authorization can in turn trigger revocation of any access authorities that recipient delegated to other recipients. Further, some delegations of authority can be evanescent, e.g., limited in duration by a passage of time or occurrence or absence of an event, after which the authority is no longer delegated. Parties are able to leverage commodity hardware to automatically mutually authenticate their credentials and access available relevant options and workflows.

In implementations, self-sovereign credentials are sequestered locally to a uniquely identifiable user device, such as a smart phone or identity badge (e.g., radio frequency identification (RFID), near-field communication (NFC) tags, integrated circuit cards, Bluetooth-enabled mobile devices, and so on). Providing users with self-sovereign credentials enables the sharing of access to data in a way that does not require the use of insecure sharing mechanisms as a sole means of authentication (e.g., email or SMS), does not require centralized credential management, and enables the sender and recipient of access credentials to validate each other's identities and share permissioned access to sensitive systems and data with a high degree of confidence. Users on a common shared directory can share and delegate access without exposing private key information; such directories might be very large and encompass entire communities comprising multiple organizations. For users who are not on a common shared directory, the invention leverages widely available and commonly used commodity hardware combined with physical affordances to rapidly enable decentralized access delegation and secure communications.

Cloud-based user authentication often requires that plaintext passwords be exposed at time of login; while these passwords are hashed and salted, there are cases where the memory is not erased and therefore passwords remain vulnerable to bad actors. In the disclosed system, a private key may remain locally-stored on a single-tenant user device, or stored on a keystore read by a multi-tenant user device. In the multi-tenant user device use case, the private key only has a short, finite tenure on the multi-tenant user device after which all related sensitive material is wiped. In both the single-tenant and multi-tenant user device scenarios, private keys never reach the server; thus, if the server were breached, an attacker would be unable to impersonate an existing user. In the event of a compromise, the issuing party can issue revocations for a particular set of identity credentials without wiping out the entire public key registry. As a result, the likelihood of a major data breach is substantially decreased, avoiding the associated potential consequences ranging from clearing a severely compromised registry to undergoing years of cleanup and reconciliation.

Architecture

FIG. 1A shows an architectural level diagram 100A of a system for access delegation leveraging private keys on single-tenant provisioned devices. Because FIG. 1A is an architectural diagram, certain details are intentionally omitted to improve clarity of the description. The discussion of FIG. 1A is organized as follows. First, the elements of the figure are described, followed by their interconnections. Then, the use of the elements in the system are described in greater detail.

System 100A includes an administrative device 112 accessible by an administrator 102, a decentralized network 164, a credentialing logic 104, and a recipient device 116 accessible by a recipient 106. Administrative device 112 comprises an access delegation logic 122, wherein access delegation logic 122 further comprises a conditional access delegation logic 132, an access credential generation logic 142, an access credential encryption logic 152, and an access credential deployment logic 162. Recipient device 116 comprises a recipient public key generation logic 126, an access credential retrieval logic 136, an access credential decryption logic 146, and an authentication logic 156.

Administrative device 112, recipient device 116, and credentialing logic 104 within system 100A interact with a decentralized network 164, wherein decentralized network 164 comprises a plurality of decentralized network nodes such as decentralized networked node 124. In some implementations of the technology disclosed, decentralized network 164 is a private permissioned blockchain data structure. In other implementations, decentralized network 164 is an alternative decentralized personal ledger data structure.

In the interconnection of the elements of system 100A, communication may occur over one or more cloud servers. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi, and WiMAX.

System 100A is configured to delegate user access to a decentralized networked node 124 within decentralized network 164, to which access has been limited to users authorized by decentralized networked node 124. Credentialing logic 104 is configured to receive authority to access a network node to invoke services that conduct operations using decentralized network 164 to which access has been limited to users authorized by decentralized networked node 124. In other implementations of the technology, credentialing logic 104 may also run on administrative device 112.

Administrator 102 uses access delegation logic 122, running on administrative device 112, to create a delegation of at least some of the authority to access a network node for a limited duration of time and to send the delegation to recipient 106.

Components of access delegation logic 122 are now discussed in further detail. Conditional access definition logic 132 is configured to generate a smart contract, a smart contract public-private key pair, and a user private key to invoke services. The user private key is stored in a keystore of recipient 106, wherein the keystore may be recipient device 116 or an additional keystore (e.g., badge) read by recipient device 116. Access credential generation logic 142 generates an access credential for recipient 106, wherein the access credential includes the recipient public key, the smart contract public key, and the smart contract. The access credential encryption logic 142 encrypts the access credential using the smart contract private key, generating an encrypted access credential. Access credential deployment logic 162 deploys the encrypted access credential such that the encrypted access credential is retrievable by recipient 106 using the recipient public key, decryptable by the recipient using the recipient private key, and revocable by administrator 102 using the smart contract private key. In some implementations, encryption and deployment of the access credential are implemented using a decentralized identity communication (DIDComm) messaging protocol, such that the DIDComm messaging protocol uses the smart contract private key as a sender and the recipient public key as a recipient. The encrypted access credential is generated as a shared secret by executing an Elliptic Curve Diffie-Hellman (ECDH) key exchange protocol. The encrypted access credential is indexed on a key-value store, wherein the key-value store is stored on decentralized network 164.

Recipient public key generation logic 126, running on recipient device 116, generates the recipient public key based on the recipient private key using an elliptic curve cryptography function. In some implementations of the disclosed system, the recipient private key is stored locally on the recipient device 116. In other implementations, the recipient private key is stored locally on a keystore read by the recipient device 116. Access credential retrieval logic 136, also running on recipient device 116, uses the recipient public key generated by recipient public key generation logic 126 to query the key-value store for the encrypted access credential and receive the encrypted access credential from the key-value store, using DIDComm messaging protocol and ECDH key exchange. Access credential decryption logic 146, running on recipient device 116, decrypts the encrypted access credential using the recipient private key, generating a decrypted access credential. Authentication logic 156, running on recipient device 116, authenticates the recipient using the decrypted access credential when the recipient seeks authentication to a particular application running on the recipient device, such that the particular application accesses a network node to which access has been limited to users authorized by decentralized network node 124.

Further continuing with the description of the system 100A, components of FIG. 1A are implemented by software running on varying types of computing devices. Example devices are a workstation, a server, a computing cluster, a blade server, and a server farm, or any other data processing system or computing device. The engine can be communicably coupled to the databases via a different network connection.

While system 100A is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

In contrast to system 100A, a system 100B is now described comprising a multi-tenant user device called a workgroup device 128. A plurality of users may all interact with workgroup device 128, wherein each particular user is authenticated using a recipient keystore read by workgroup device 128.

Figure 1B:
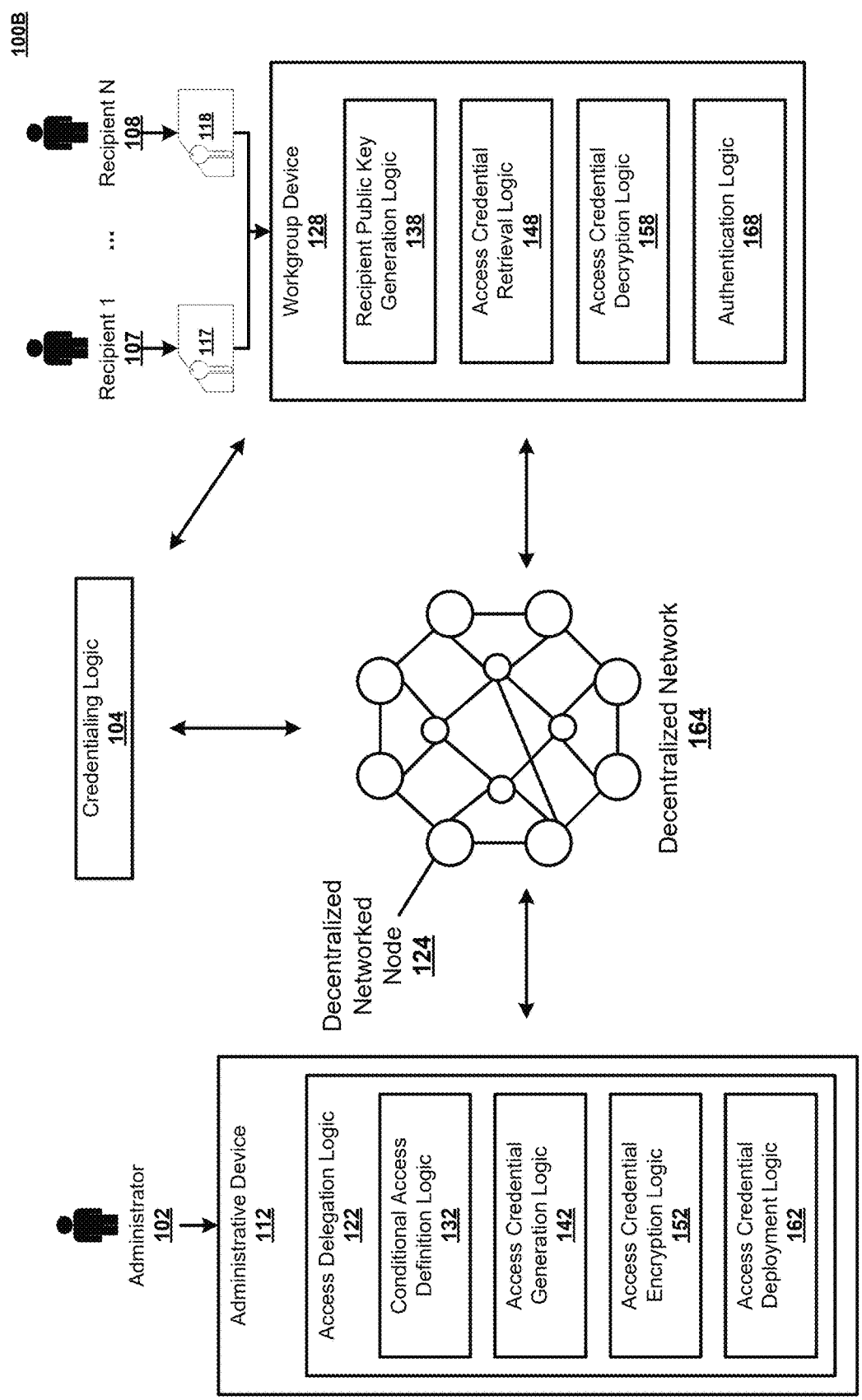
FIG. 1B shows an architectural level diagram of a system for access delegation leveraging private keys on keystores read by multi-tenant provisioned devices.

FIG. 1B shows an architectural level diagram of a system 100B for access delegation leveraging private keys on keystores read by multi-tenant provisioned devices. Because FIG. 1B is an architectural diagram, certain details are intentionally omitted to improve clarity of the description. The discussion of FIG. 1B is organized as follows. First, the elements of the figure are described, followed by their interconnections. Then, the use of the elements in the system are described in greater detail.

System 100B includes an administrative device 112 accessible by an administrator 102, a decentralized network 164, a credentialing logic 104, and a workgroup device 128 accessible by a plurality of recipients including a first recipient 107 through an $n^{th}$ recipient 108. Administrative device 112 comprises an access delegation logic 122, wherein access delegation logic 122 further comprises a conditional access delegation logic 132, an access credential generation logic 142, an access credential encryption logic 152, and an access credential deployment logic 162. Workgroup device 128 comprises a recipient public key generation logic 138, an access credential retrieval logic 148, an access credential decryption logic 158, and an authentication logic 168.

The unit cost and ongoing maintenance of mobile devices provisioned to users within an enterprise often makes their use prohibitively expensive and difficult to manage over time. In many cases, a multi-tenant device provides an economical and readily supported solution. Unfortunately, this introduces an additional set of security complications. For example, in the pharmaceutical supply chain, information access management and auditability requirements demand that each interaction on such a system must be traceable to a single individual user. Many methods exist to authenticate user identity on a multi-tenant device including passwords, passcodes, facial recognition, fingerprint recognition, etc. In these cases, the credentialed user is required to undergo their own set-up process, and/or consent to the disclosure and use of sensitive biometric information in an era of increasing concern related to biometric data privacy. Passcodes are highly vulnerable due to their brevity, and longer, more complex passwords can be difficult to remember, both requiring regular rotations. Facial recognition has a 1:1,000,000 failure rate; while this may be acceptable for single-tenant devices, it is less acceptable for a device that performs regular re-authentication of a plurality of users. In contrast, a 256-bit key is difficult to attack and can be committed to a variety of keystores.

Recipients 1 107 through N 108 access workgroup device 128 via respective keystores 117 through 118. Keystore 117 stores the user private key of recipient 1 107, such that workgroup device 128 reads the keystore 117 of recipient 1 107 to obtain the user private key of recipient 1 107 to access privileges delegated to recipient 1 107. A similar protocol is enacted for recipient N 108 and keystore 118. In addition to a mobile device such as a computer, tablet, or smartphone, keystores 117 through 188 for recipients 1 107 through 108 may take the form of an RFID badge, NFC tag, Bluetooth-compatible hardware, USB dongles, link-local IP addresses on Wi-Fi chips, optical tags and patterns capable of being read by sensors (e.g., one-dimensional bar codes, Quick-Response (QR) codes, DataMatrix, et cetera), or physical cards with magnetic stripes, integrated circuits, and EMV chips. The keystore may be a pre-existing provisioned device prepared to receive user issuance, or a newly-generated device provisioned in response to a specific need as it arises, such as a printed badge following a request for access delegation. A user skilled in the art will recognize that these methods for information exchange between devices are listed explicitly as examples not to be considered as a limitation of the disclosed technology, and a variety of other close-range communication technologies exist within the scope of the disclosed technology.

Administrative device 112, workgroup device 128, and credentialing logic 104 within system 100B interact with a decentralized network 164, wherein decentralized network 164 comprises a plurality of decentralized network nodes such as decentralized networked node 124. In some implementations of the technology disclosed, decentralized network 164 is a private permissioned blockchain data structure. In other implementations, decentralized network 164 is an alternative decentralized personal ledger data structure.

In the interconnection of the elements of system 100B, communication may occur over one or more cloud servers. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi, and WiMAX.

System 100B is configured to delegate user access to a decentralized networked node 124 within decentralized network 164, to which access has been limited to users authorized by decentralized networked node 124. Credentialing logic 104 is configured to receive authority to access a network node to invoke services that conduct operations using decentralized network 164 to which access has been limited to users authorized by decentralized networked node 124. In other implementations of the technology, credentialing logic 104 may also run on administrative device 112.

Access delegation logic 122 running on administrative device 112 may behave similarly in both system 100A involving single-tenant recipient device 116 and system 100B involving multi-tenant workgroup device 128. A user skilled in the art will recognize that conditional access definition via smart contract generation and access credential generation may each respectively comprise non-overlapping parameters or metadata to appropriately fit the particular implementation.

Recipient public key generation logic 138, access credential retrieval logic 148, access credential decryption logic 158, and authentication logic 168 operating on workgroup device 128 may behave similarly to recipient public key generation logic 126, access credential retrieval logic 136, access credential decryption logic 146, and authentication logic 156 operating on recipient device 116. A user skilled in the art will recognize that recipient public key generation and access credential retrieval may each respectively comprise non-overlapping parameters or metadata to appropriately fit the particular implementation. In particular, logics 138, 148, 158, and 168 operate using the recipient private key stored on each respective recipient keystore, such that the recipient private key is temporarily stored on workgroup device 128 and erased following authentication.

Further continuing with the description of the system 100B, components of FIG. 1B are implemented by software running on varying types of computing devices. Example devices are a workstation, a server, a computing cluster, a blade server, and a server farm, or any other data processing system or computing device. The engine can be communicably coupled to the databases via a different network connection.

While system 100B is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Decentralized Credential Issuance

To elaborate further on the interconnectedness of the components of system 100A and the components of system 100B, respectively, a series of message flow diagrams are now described for the provisioning of user credentials and access credentials leveraging private keys stored locally on provisioned devices.

FIG. 2A shows a message flow diagram 200A for the provisioning of user credentials. A credentialing logic 104 interacts with a recipient keystore 118 and a key-value store 202. The recipient keystore 118 may be a mobile device such as a single-tenant smartphone or tablet provisioned with device credentials such that the device can access key-value store 202. In other implementations, the recipient keystore 118 is an alternative hardware device such as an RFID badge, NFC-tagged key fob, integrated circuit card, QR-code enabled device, et cetera, such that the recipient keystore 118 is read by a multi-tenant smartphone or tablet provisioned with device credentials such that the device can access key-value store 202. Key-value store 202, which may be located on decentralized network 164 or an alternative blockchain network, decentralized ledger, cloud-based server, or database, comprises a plurality of user credentials and access credentials corresponding to a plurality of recipients within an organization, such that credentials are indexed by the appropriate recipient public key. In addition to recipients using a particular device, the devices themselves within an organization may also be provisioned device credentials to which access may be delegated, such as access to key-value store 202, a particular decentralized network node within decentralized network 164, or a particular permissioned function within an application programming interface (API)/graphical user interface (GUI).

In step 222, the credentialing logic 104 generates a public-private key pair for the recipient and a recipient credential. The recipient credential may contain a plurality of information types such as the recipient public key, the recipient user ID, a digital signature from a trusted authority, and additional metadata related to the recipient. In step 242, credentialing logic 104 sends the recipient public key and recipient credential to the key-value store 202. Specifically, the recipient credential is encrypted using an administrative private key and transmitted using DIDComm messaging protocol and ECDH key exchange.

In some implementations, the administrative private key used for encryption is an ephemeral administrative private key such that the private key is produced for ECDH exchange, and then the administrator authenticates separately by ECDSA-signing using the administrator's credential private key (where the administrator credential private key is a long-lived private key and different from the ephemeral key). Within a XATP implementation, an ephemeral administrative private key is generated, but the credential itself possesses all of the necessary content and thus no signature is necessary. Because the recipient private key stored on recipient keystore 118 is sufficient to decrypt the encrypted recipient credential, the ephemeral administrative private key is deleted following the single-use of encrypting the recipient credential. The key-value store 202 will store the encrypted recipient credential indexed by the recipient public key, where it is retrievable by the recipient via the recipient private key.

Finally, in step 262, the credentialing logic 104 transmits the recipient private key to the recipient keystore 118. Following steps 242 and 262, the recipient keypair, recipient credential, and ephemeral administrative private key are erased from the administrative device (e.g., administrative device 112) for privacy protection.

In implementations comprising recipient keystore 118 as a single-tenant recipient device 116, the recipient private key is stored locally on a mobile device. Recipient device 116 has previously been provisioned with device credentials by credentialing logic 104, wherein the device credentials for recipient device 116 have been delegated access to key-value store 202. Recipient device 116 serves as recipient keystore 118, and can access the encrypted recipient credential using the recipient private key.

In other implementations, recipient keystore 118 is an alternative hardware device, as previously described. Herein, for simplicity of description, the keystore to be read by a mobile device will be assumed to be an RFID badge; however, it is to be understood that this is explicitly an example and a plurality of additional hardware devices may be implemented to serve the same function without departing from the spirit and scope of the technology disclosed. Recipient keystore 118 may interact with a recipient device 116 via close-range communication (i.e., coming into close proximity or coming into contact via a tap or swipe). In this implementation, recipient device 116 is able to read the recipient private key from recipient keystore 118 to ascertain the recipient private key, and the recipient device credentials allow recipient device 116 to query key-value store 202 for the recipient credential using the recipient public key. Following authentication, the recipient private key is erased from the recipient device 116 for privacy protection purposes.

Alternatively, recipient keystore 118 may also interact with a multi-tenant device such as workgroup device 128. Because the recipient private key is erased following authentication and will not be stored on workgroup device 128 (e.g., the recipient signs out from the application or function to which they have been authenticated or access times out, forcing a logout), privacy is maintained and a separate user seeking authentication must provide their own private key via their own keystore. While a plurality of private keys corresponding to a plurality of recipients could be stored locally on the workgroup device 128, accessible by an additional form of authentication such as a passcode or biometric, this increases the risk probability and extent of risk of a security leak. Whereas a stolen workgroup device 128 comprising a plurality of private keys may compromise a plurality of users, a stolen recipient keystore 118 comprising a single private key may only compromise a single user. Moreover, it becomes increasingly difficult for a bad actor to inappropriately authenticate using a workgroup device 128 wherein a separate recipient keystore 118 is necessary for authentication. Thus, the combination of the workgroup device 128 and recipient keystore 118 perform multi-factor authentication where the private key on the recipient keystore 118 serves as the key while the workgroup device 128 serves as the lock.

Decentralized Access Delegation

Figure 2B:
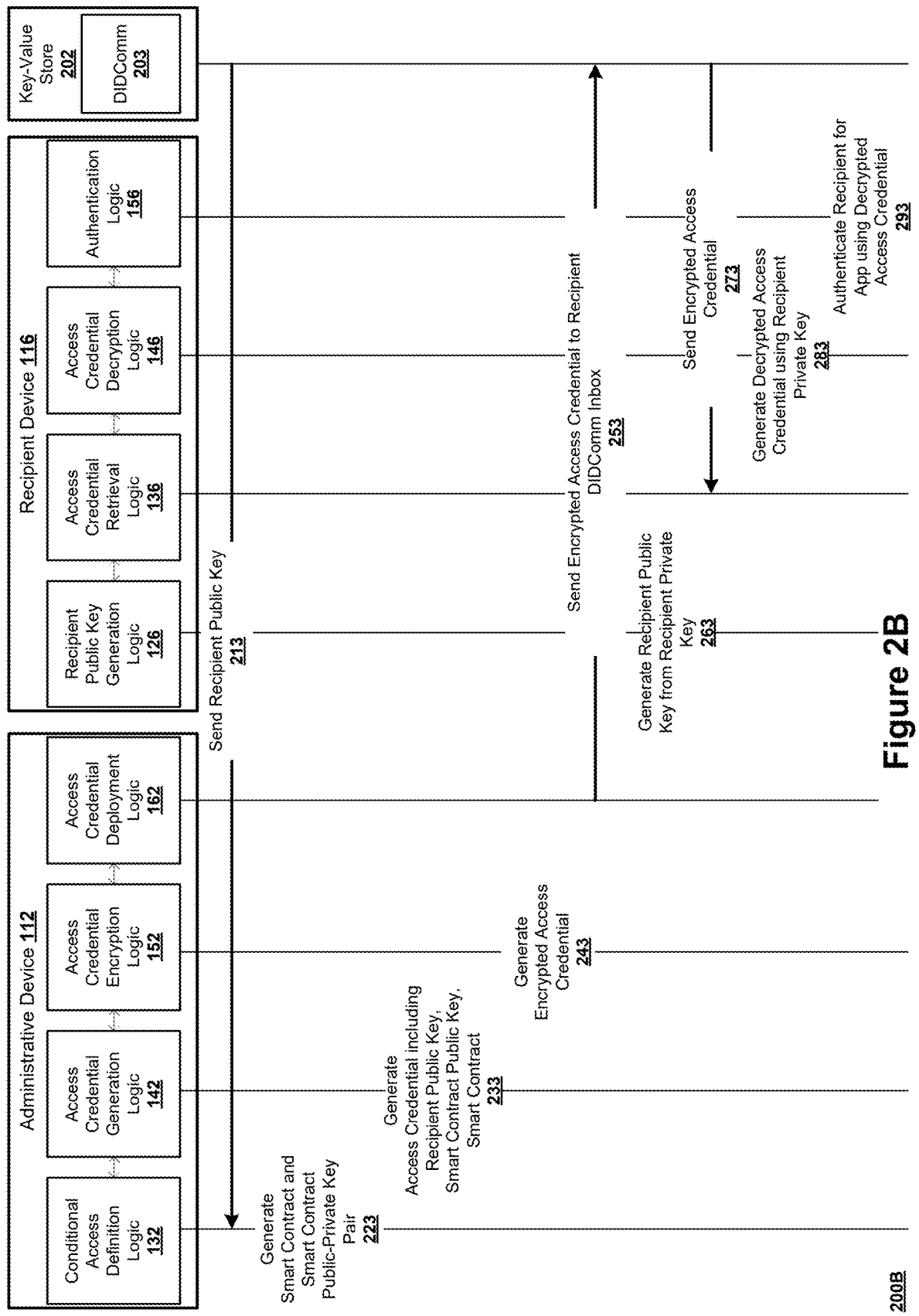
FIG. 2B shows a message flow diagram for access delegation leveraging a private key stored on a single-tenant provisioned device.
Figure 2C:
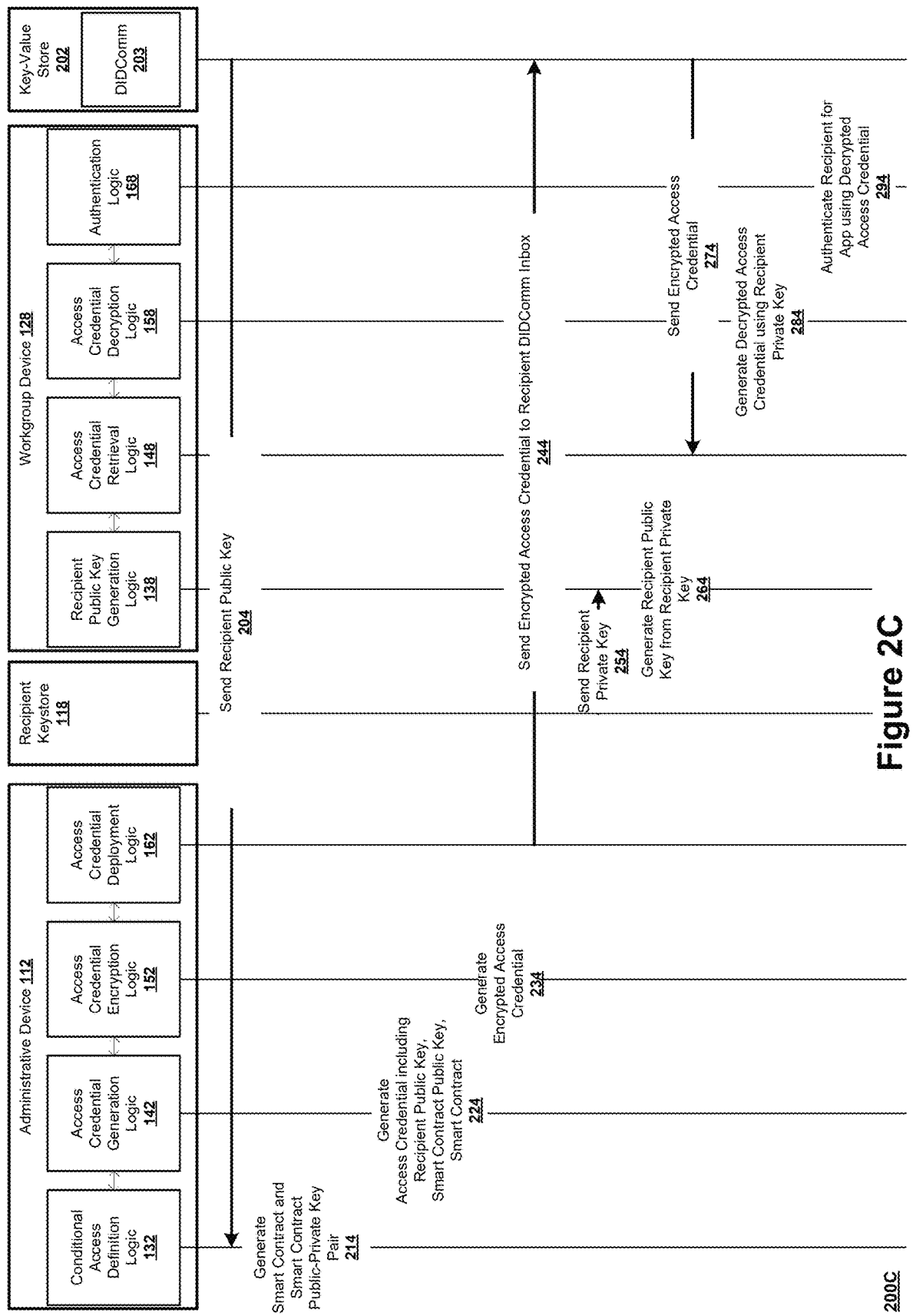
FIG. 2C shows a message flow diagram for access delegation leveraging a private key stored on a keystore read by a multi-tenant provisioned device.

Once a user has been provisioned credentials that can be accessed within key-value store 202, administrator 102 is able to look up the recipient within the key-value store 202 to delegate new access privileges to the recipient. FIGS. 2B and 2C describe two example message flow diagrams for the delegation of access privileges to a recipient.

FIG. 2B shows a message flow diagram 200B for access delegation leveraging a private key stored on a single-tenant provisioned device. Diagram 200B comprises an administrative device 112, a recipient device 116, and a key-value store 202. Administrative device 112 is configured to run components of access delegation logic 122: a conditional access definition logic 132, an access credential generation logic 142, an access credential encryption logic 152, and an access credential deployment logic 162. Double-sided arrows in between condition access definition logic 132, access credential generation logic 142, access credential encryption logic 152, and access credential deployment logic 162 indicate data communication between these logics, and it is to be understood that for diagram clarity, data and information generated by a particular logic component within access delegation logic 122 are accessible to other logic components within access delegation logic 122.

Recipient device 116 is configured to run a recipient public key generation logic 126, an access credential retrieval logic 136, an access credential decryption logic 146, and an authentication logic 156. Double-sided arrows in between recipient public key generation logic 126, access credential retrieval logic 136, access credential decryption logic 146, and authentication logic 156 indicate data communication between these logics, and it is to be understood that for diagram clarity, data and information generated by a particular logic component within recipient device 116 are accessible to other logic components within recipient device 116.

Key-value store 202 comprises a DIDComm messaging protocol 203, wherein recipients have recipient public key-indexed DIDComm Inboxes to and from which user credentials and access credentials may be transmitted. If an administrator intends to delegate an access privilege to a particular recipient, the recipient public key may be identified within key-value store 202 and sent to administrative device 112, as in step 213. Following step 213, step 223 involves the conditional access definition logic 132 generating a smart contract comprising one or more smart contract conditions, in which a smart contract condition defines an access limitation. Along with the generation of a smart contract, step 223 also generates a public-private key pair for the smart contract. In step 233, access credential generation logic 142 generates an access credential comprising the recipient public key, smart contract public key, and the smart contract.

In step 243, the generated access credential is encrypted using the smart contract private key and recipient public key by access credential encryption logic 152. Access credential deployment logic 162 sends the encrypted access credential to the recipient's DIDComm inbox in step 253. In many implementations, encryption and transmission of the access credential use DIDComm messaging protocol and ECDH key exchange, as previously described for transmission of user credentials within system 200A. Again, the smart contract private key used during encryption may be an ephemeral key.

Once the encrypted access credential is stored in the recipient's DIDComm inbox 203, it can be accessed by the recipient device 116 using the recipient private key. This may be triggered by a notification sent by the decentralized network 164 to the recipient via recipient device 116 notifications or other forms of communication such as email, telephone, or supervisor confirmation, or triggered by the recipient requesting to check for this information using recipient device 116. To retrieve the encrypted access credential, the recipient public key is necessary to query the key-value store 202. In step 263, the recipient public key generation logic 126 generates the recipient public key from the recipient private key, so that the recipient private key may be used by the access credential retrieval logic 136 to request the encrypted access credential from key-value store 202. Key-value store 202 sends the encrypted access credential via DIDComm 203 protocol in step 273. In step 283, access credential decryption logic 146 generates the decrypted access credential using the recipient private key. Finally, once the access credential has been decrypted, it can be used by authentication logic 156 in step 293 to authenticate the recipient for an application, decentralized application ("DApp"), permissioned function, or authority to access a network node to invoke services that conduct operations using decentralized network 164 to which access has been limited to users authorized by one of the decentralized networked nodes, such as decentralized network node 124.

In other implementations, the recipient to be credentialed is not within a centralized database such that the recipient does not already have a provisioned public/private key pair and the recipient public key is not discoverable to the administrator 102 using the key-value store 202. In many scenarios, the use of a shared directory is not feasible or efficient. Some complex operational environments may involve different levels of credentials with large numbers of employees in different departments and locations, therefore a single directory would be unwieldy. Other operations might involve users from different organizations that do not share a common ledger, such as external auditors or partner organizations. Many real-world use cases for the disclosed systems involve a credentialed user who wishes to share access with an uncredentialed user.

In these use cases, the sender needs the recipient to have a device credential to which access can be delegated, and the device credential needs to be discoverable by the sender. Communication channels such as email and SMS involve significant security vulnerabilities. Alternatively, near-range communication between devices, such as those previously described for recipient keystore hardware devices, offers a way for access to be delegated without sharing of private keys or other sensitive information. Devices for close-range communication of access credentials may involve any combination of computers, mobile phones, RFID/NFC technology, hardware wallets, or any other pair of devices capable of locally exchanging information.

In an embodiment of the disclosed system that does not use key-value store 202 for credential exchange, a sender (i.e., administrator 102) has a device (i.e., administrative device 112) with an application leveraging an onboard private key that is generated at the time that the application is downloaded. The onboard private key (which may be referred to as a "device credential" herein) is independent from any other keys or identity credentials that may be held on the device, such as the user credential of administrator 102. The recipient uses a device that also possesses an application (wherein the application is the same application on administrative device 112, a similar or corresponding application to that on administrative device 112, or a distinct-but-related application to that on administrative device 112) leveraging a separate onboard private key generated at the time that the application was downloaded. The onboard private key or device credential is independent from any other keys or identity credentials that may be held on the device and is not equivalent to a user credential for the recipient.

The sender's device requests the public key of the recipient device (alternatively, the transaction may be initiated by the sender and recipient together as compared to initiated by the sender alone) and the recipient device provides the public key through a localized method of information exchange. The localized method of information exchange bypasses server channels; hence, no private key information is shared with the cloud. The sender is presented with a plurality of smart contract options and selects one or more options including smart contract conditions and limitations. Upon generation of the smart contract, a smart contract public-private key pair is also generated. In one implementation of the technology disclosed, such as a scenario in which the recipient's role within the enterprise is limited, the smart contract is included in an encrypted access credential along with the smart contract public key and the recipient device's public key. In another implementation of the technology disclosed, such as a scenario in which the recipient's role within the enterprise is on-going and the recipient requires issuance of credentials, access delegation logic 122 generates a recipient credential at the same time as the access credential. Thus, a new private key is set up for the recipient and transmitted onto the recipient device using close-range communication. The access credential will contain the smart contract public key, the newly-generated recipient public key, and the smart contract.

As previously described in the description of diagrams 200A and 200B, the encrypted credential is stored on the key-value store and can be accessed by the recipient device at any time. The recipient device uses its device credentials to access the appropriate DIDComm inbox and receive the encrypted credential, which is decrypted using the appropriate private key (either the device private key or the newly-generated recipient private key) and the recipient can be authenticated using the decrypted credential.

Thus far, the discussion has addressed that a recipient private key may be stored on a mobile device, such as a smartphone, or on a keystore, such as an RFID badge to be read by a device that may be single-tenant or multi-tenant. The message flow diagram in system 200B primarily focuses on embodiments in which a recipient private key is stored directly on a device that runs the application to which the user is requesting access. In contrast, the discussion now turns to a similar scenario in which the recipient keystore storing the recipient private key is distinct from a workgroup device, shared by multiple users, that runs the application to which the user is requesting access.

FIG. 2C shows a message flow diagram 200C for access delegation leveraging a private key stored on a keystore read by a multi-tenant provisioned device. Diagram 200C comprises an administrative device 112, a workgroup device 128, and a key-value store 202. As seen in diagram 200B, administrative device 112 is configured to run components of access delegation logic 122: a conditional access definition logic 132, an access credential generation logic 142, an access credential encryption logic 152, and an access credential deployment logic 162. Double-sided arrows in between condition access definition logic 132, access credential generation logic 142, access credential encryption logic 152, and access credential deployment logic 162 indicate data communication between these logics, and it is to be understood that for diagram clarity, data and information generated by a particular logic component within access delegation logic 122 are accessible to other logic components within access delegation logic 122.

Workgroup device 128 is configured to run a recipient public key generation logic 138, an access credential retrieval logic 148, an access credential decryption logic 158, and an authentication logic 168. Double-sided arrows in between recipient public key generation logic 138, access credential retrieval logic 148, access credential decryption logic 158, and authentication logic 168 indicate data communication between these logics, and it is to be understood that for diagram clarity, data and information generated by a particular logic component within workgroup device 128 are accessible to other logic components within workgroup device 128.

Key-value store 202 comprises DIDComm messaging protocol 203. If an administrator intends to delegate an access privilege to a particular recipient, the recipient public key may be identified within key-value store 202 and sent to administrative device 112, as in step 213 and step 204. Following step 204, step 214 involves the conditional access definition logic 132 generating a smart contract comprising one or more smart contract conditions, in which a smart contract condition defines an access limitation. Along with the generation of a smart contract, step 214 also generates a public-private key pair for the smart contract. In step 224, access credential generation logic 142 generates an access credential comprising the recipient public key, smart contract public key, and the smart contract.

In step 234, the generated access credential is encrypted using the smart contract private key and the recipient public key by access credential encryption logic 152. Access credential deployment logic 162 sends the encrypted access credential to the recipient's DIDComm inbox in step 244. In many implementations, encryption and transmission of the access credential use DIDComm messaging protocol and ECDH key exchange, as previously described for transmission of user credentials within system 200A and 200B. Again, the smart contract private key used during encryption may be an ephemeral key.

Once the encrypted access credential is stored in the recipient's DIDComm inbox 203, it can be accessed by the workgroup device 128 using the recipient private key. However, in the multi-tenant device embodiment, the private key is stored on recipient keystore 118 as compared to storage on the workgroup device 128. Notification of the newly delegated access privileges may be triggered by a notification sent by the decentralized network 164 to the recipient via forms of communication such as email, telephone, or supervisor confirmation, or triggered by the recipient requesting to check for this information using workgroup device 128 via presenting the recipient keystore 118 to the device for close-range communication, as performed in step 254. To retrieve the encrypted access credential, the recipient public key is necessary to query the key-value store 202. In step 264, the recipient public key generation logic 138 generates the recipient public key from the recipient private key, so that the recipient private key may be used by the access credential retrieval logic 148 to request the encrypted access credential from key-value store 202. Key-value store 202 sends the encrypted access credential via DIDComm 203 protocol in step 274. In step 284, access credential decryption logic 158 generates the decrypted access credential using the recipient private key. Finally, once the access credential has been decrypted, it can be used by authentication logic 168 in step 294 to authenticate the recipient for an application, decentralized application ("DApp"), permissioned function, or authority to access a network node to invoke services that conduct operations using decentralized network 164 to which access has been limited to users authorized by one of the decentralized networked nodes, such as decentralized network node 124.

Generation of Smart Contracts for the Delegation of Credentialed Access

Figure 3A:
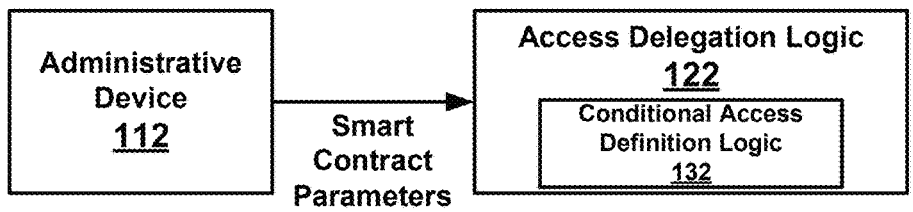
FIG. 3A shows a sequence of flow diagrams for sending an encrypted access credential to a recipient's registered DIDComm inbox via end-to-end encryption.
Figure 3A:
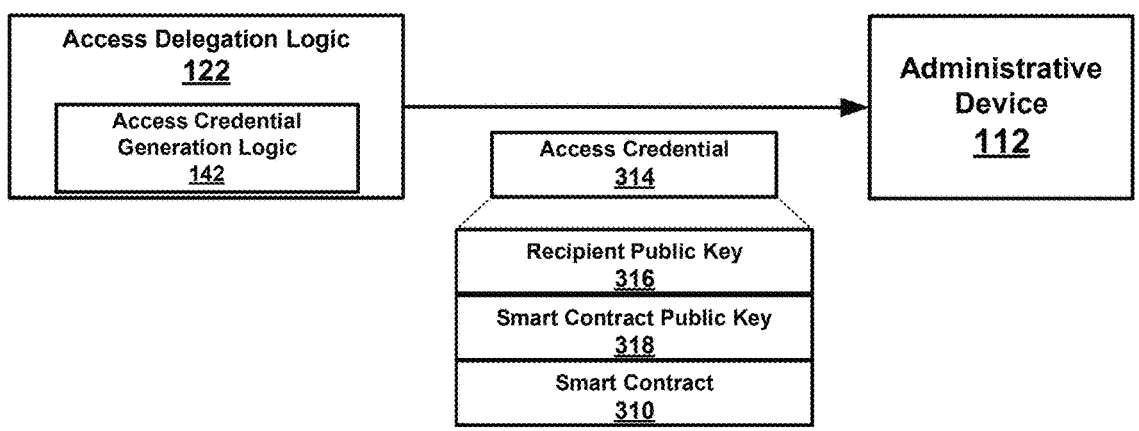
Figure 3A:
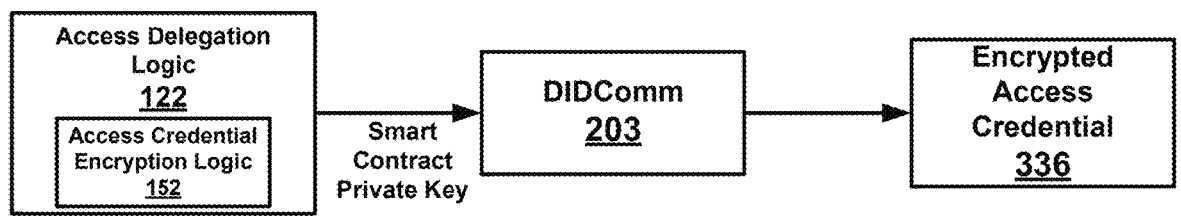
Figure 3A:
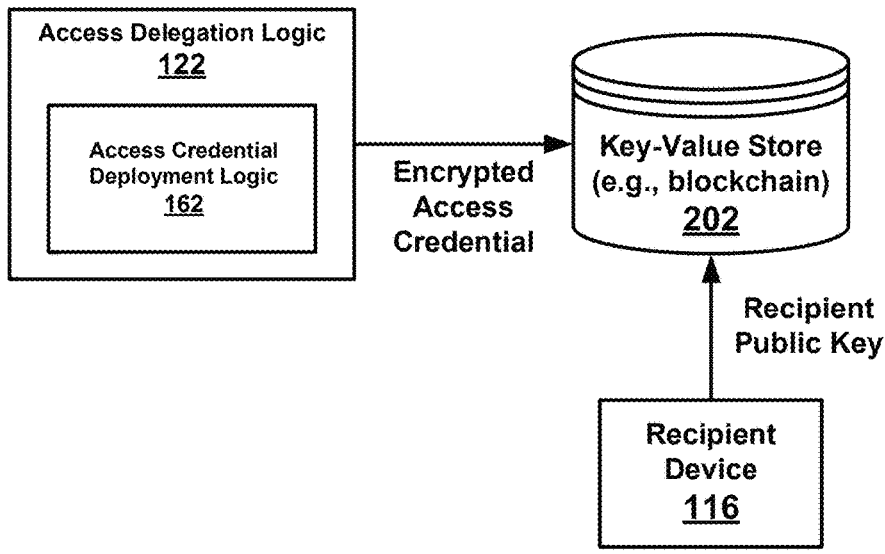

The disclosed system implements smart contracts for the delegation of credentialed access. The generation and deployment of these smart contracts will now be elaborated upon further. FIG. 3A follows an implementation comprising the single-tenant recipient device 116, whereas FIG. 3B follows an implementation comprising the multi-tenant workgroup device 128 such that both implementations are represented for breadth. However, the processes shown in both FIG. 3A and FIG. 3B may each be implemented with either a single-tenant device or a multi-tenant device, and with or without a separate recipient keystore to be read by a device.

FIG. 3A shows a sequence of flow diagrams 300A for sending an encrypted access credential to a recipient's registered DIDComm inbox via end-to-end encryption. The sequence of steps mirrors that of the administrative access delegation logic 122 described in systems 100A and 100B, transitioning from conditional access definition 310 to access credential generation 320, to access credential encryption 330, and finally, to access credential deployment 340.

Conditional access definition 310 comprises the generation of a smart contract. The administrative device 112 is used by administrator 102 to select a plurality of smart contract parameters defining the conditions of access for the recipient. These smart contract parameters are processed as input by conditional access definition logic 132 within access delegation logic 122. As a result, smart contract 310 is generated and a corresponding public-private key pair is also generated for the smart contract.

In access credential generation 320, the access credential generation logic 142 within access delegation logic 122 generates access credential 314. Access credential 314 comprises the recipient public key 316, smart contract public key 318, and smart contract 310, wherein the access credential (along with the smart contract public-private key pair; not shown) are initially temporarily stored on administrative device 112. Next, access credential 310 must be encrypted within access credential encryption 330. The access credential encryption logic 152 within access delegation logic 122 uses the smart contract private key (and the recipient public key) to encrypt access credential 310 using ECDH key exchange and DIDComm communication for end-to-end encryption, generating a final output of encrypted access credential 336.

Finally, access credential deployment 340 comprises the deployment of the encrypted access credential 336 to the recipient DIDComm inbox within the key-value store 202 by access credential deployment logic 162 within access delegation logic 122. The encrypted access credential 310 is accessible to recipient device 116 (or workgroup device 128) within the key-value store 202 via querying by the recipient public key. If the generation of a new user private key for the recipient is required (i.e., the recipient does not possess user credentials present within key-value store 202), the recipient private key will be transmitted to recipient device 118 as well. Following transmission of the encrypted access credential 336 to key-value store 202, and any transmission of a recipient private key to recipient device 118 if necessary, any data associated with the access credential or recipient credentials are erased from administrative device 112 for privacy protection. Additionally, whereas the smart contract private key is exclusively stored on the administrative device 112, the smart contract public key and smart contract are also erased from administrative device 112.

Figure 3B:
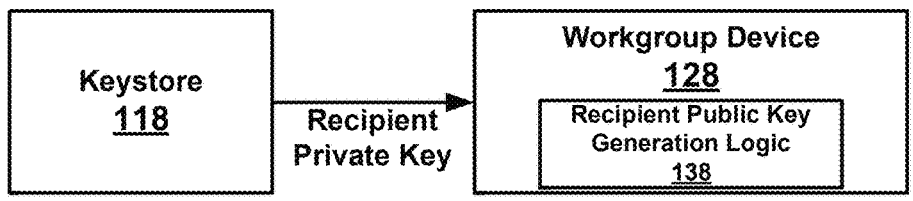
FIG. 3B shows a sequence of flow diagrams for authenticating a recipient using decryption of an encrypted access credential received via DIDComm messaging protocol.
Figure 3B:
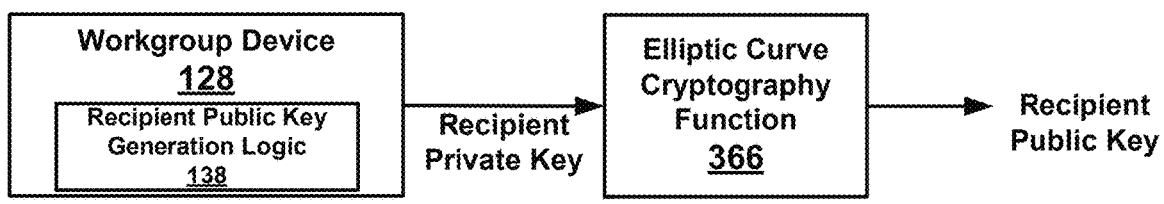
Figure 3B:
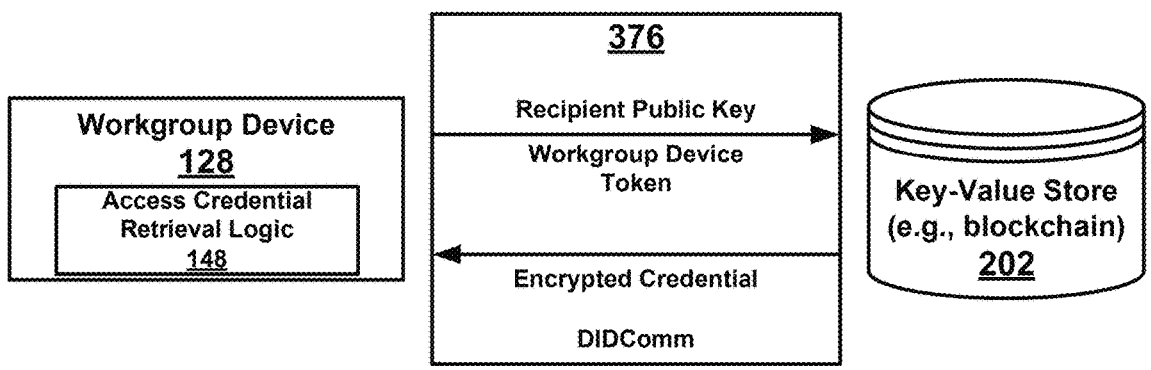
Figure 3B:
Figure 3B:
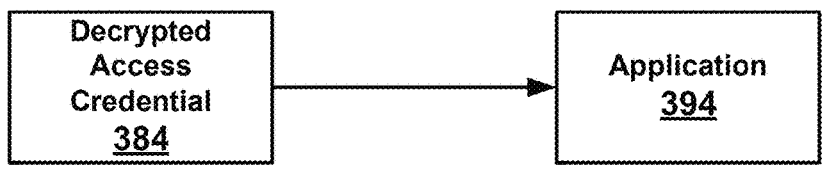

FIG. 3B shows a sequence of flow diagrams 300B for authenticating a recipient using decryption of an encrypted access credential 336 received using DIDComm messaging protocol. The sequence of steps mirrors that of the authentication process described in system 100B, transitioning from recipient private key exchange 350 to recipient public key generation 360, to access credential retrieval 370, to access credential decryption 380, and finally, to recipient authentication 390.

First, recipient private key exchange 350 is performed such that a recipient keystore 118 provides the recipient private key to a workgroup device 128, where workgroup device 128 is configured to run recipient public key generation logic 138. This step is a necessary precursor to obtaining the access credential because the recipient private key is exclusively stored on keystore 118. Next, recipient public key generation 360 comprises the recipient public key generation logic 138 (running on workgroup device 128) processing the recipient private key as input for an elliptic curve cryptography function 366 to generate a recipient public key as output.

The recipient public key can be used within access credential retrieval 370. Access credential retrieval logic 148, running on workgroup 128, provides the recipient public key (used to query the key-value store 202 for the appropriate access credential) and workgroup device token or credential (the workgroup device credential has been delegated access to the key-value store 202 to receive the appropriate access credential) with the key-value store 202 in exchange for the encrypted access credential 336, sent using DIDComm messaging. Once the encrypted access credential 336 has been retrieved, access credential decryption 380 (carried out by workgroup device 128 via access credential decryption logic 158) decrypts the encrypted access credential 336 with the recipient private key to obtain the decrypted access credential 384.

Finally, recipient authentication 390 (carried out by workgroup device 128 via authentication logic 168) can use the decrypted access credential 384 to access an application 394. Following authentication, any information corresponding to the access credential or the recipient credential (e.g., the recipient private key, recipient public key, recipient user ID, the smart contract, smart contract public key, or any other recipient metadata).

The smart contract transmitted to the recipient in sequences 300A and 300B comprises a plurality of conditional access terms, such that the access a recipient is delegated to a particular network node is limited in one or more fashions. As an example, delegation of some of the authority to access the network node for a limited duration of time may comprise an evanescent credential such that an automatic deletion is performed of any evidence supporting the recipient at an expiry of the duration of time. Further smart contract conditions examples are given below within the contact of a Sender P authorizing a Recipient N to access a particular function, digital resource (e.g., a form of data or information stored on decentralized network 164), or physical resource.

Figure 4:
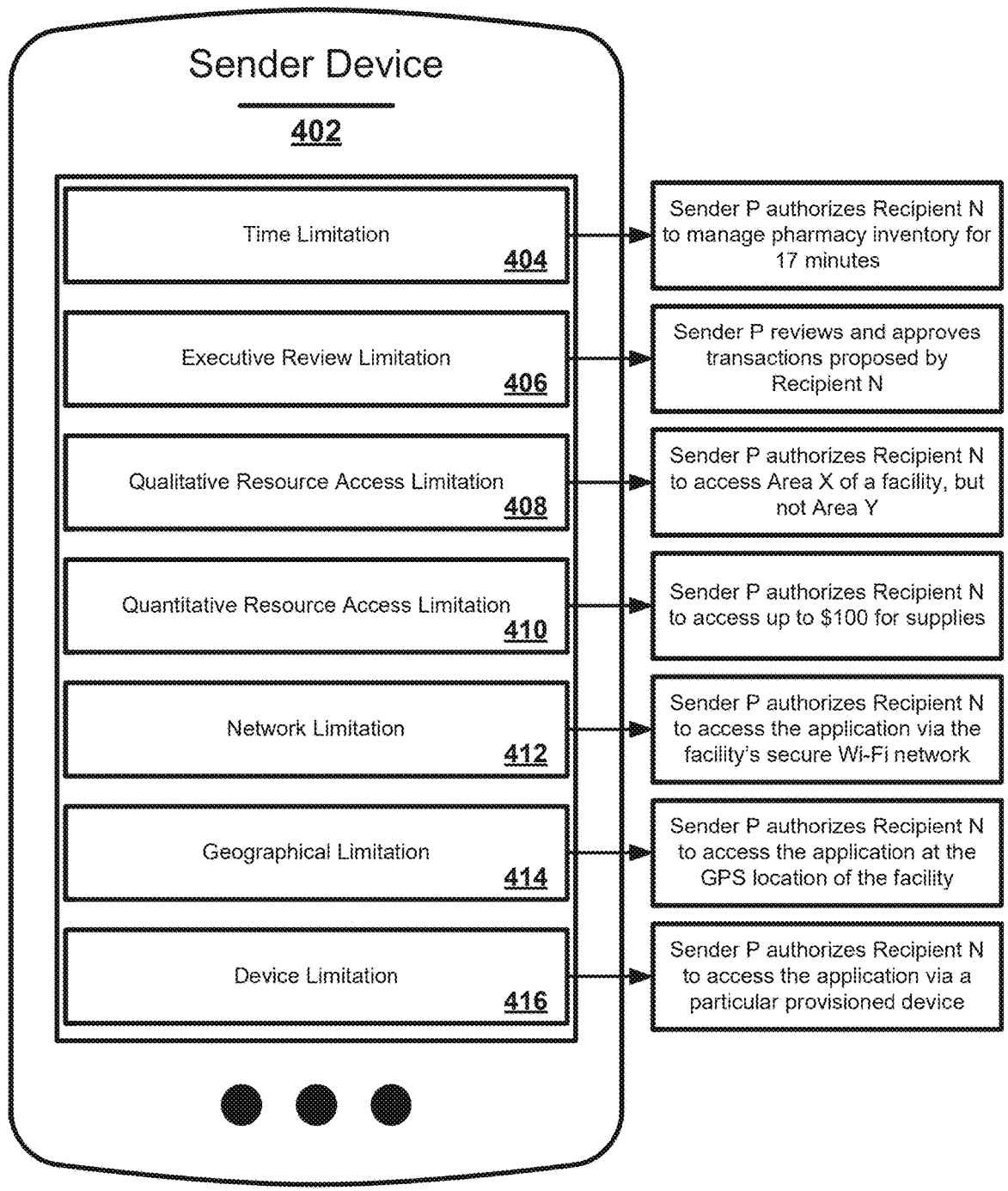
FIG. 4 illustrates a plurality of example smart contract conditions.

FIG. 4 illustrates a plurality of example smart contract conditions. Within diagram 400, a sender device 402 presents a plurality of smart contract options to Sender P. Smart contract conditions presented as options to Sender P include a time limitation 404, an executive review limitation 406, a qualitative resource access limitation 408, a quantitative resource access limitation 410, a network limitation 412, a geographical limitation 414, or a device limitation 416. A user skilled in the art will recognize that the example smart contract conditions listed in diagram 400 are not to be considered as limiting examples, and a wide range of smart contract conditions may be implemented for conditional access where the range of smart contract conditions is expanded by the variety of enterprise operations and functionality, characteristics of the access to be delegated, and both the hardware and software technologies selected to implement the disclosed system.

A time limitation 404 introduces an evanescent nature to the delegated access, such that the access privilege is set to expire at a pre-determined future time or date. As an example, consider a scenario in which Sender P authorizes Recipient N to manage a pharmacy inventor for 17 minutes, after which, the access privilege will be revoked. An executive review limitation 406 introduces a supervisory nature to the delegated access, such that the access privilege is limited by a review process conducted by sender P. As an example, consider a scenario in which Sender P authorizes Recipient N to access a particular private permissioned resource; however, any transactions proposed by Recipient N related to the private permissioned resource are pending and will not be executed until Sender P reviews and approves the transactions proposed.

A qualitative resource access limitation 408 introduces a categorical resource restriction to the delegated access, such that the access privilege is defined by a pre-determined resource qualitative characteristic or categorization. As an example, consider a scenario in which Sender P authorizes Recipient N to access Area X of a facility without authorizing Recipient N to access Area Y of the facility. A quantitative resource access limitation 410 introduces a categorical resource restriction to the delegated access, such that the access privilege is defined by a pre-determined resource quantitative metric or restricting value, such that the access privilege is set to expire once a pre-determined quantitative measurement of a particular permissioned private resource has been reached. As an example, consider a scenario in which Sender P authorizes Recipient N to purchase supplies for inventory such that the access is revoked once Recipient N has purchased one-hundred dollars' worth of supplies.

A network limitation 412 introduces a network connection-restricted nature to the delegated access, such that authentication to the access privilege is only successful when Recipient N requests authentication while connected to a particular network or server. As an example, consider a scenario in which Sender P authorizes Recipient N to access a particular application on their device when Recipient N's device is connected to the enterprise facility's secure Wi-Fi network, but authentication requests will be unsuccessful while the device is not connected to the specified Wi-Fi network. A geographical limitation 414 introduces a geolocation-restricted nature to the delegated access, such that authentication to the access privilege is only successful when Recipient N requests authentication while located within a pre-determined proximity to a particular location. As an example, consider a scenario in which Sender P authorizes Recipient N to access a particular application on their device when Recipient N's device is identified by the device location tracking services to be located at the enterprise facility's GPS coordinates, but authentication requests will be unsuccessful while the device is not identified to be present at the enterprise facility.

A device limitation 416 introduces a device-specific nature to the delegated access, such that authentication to the access privilege is only successful when Recipient N requests authentication from an approved provisioned device. As an example, consider a scenario in which Sender P authorizes Recipient N to access an enterprise application via a recipient device provisioned by an administrator with a uniquely identifiable device credential (i.e., authentication requires both the recipient credential and a particular device credential). If Recipient N attempts to access an enterprise application on their personal smartphone device, authentication requests will be unsuccessful. Moreover, if Recipient N attempts to inappropriately access a Recipient M's access privileges via Recipient M's device, authentication requests will be unsuccessful.

The use of smart contracts within decentralized access delegation introduces a greater degree of control when delegating access privileges to users which, in turn, introduces a greater degree of risk protection for the enterprise. Thus, in the event that a bad actor inappropriately obtains an enterprise device or keystore, it is unlikely that the bad actor will be able to successfully meet the conditions necessary to obtain access. The bad actor may be unable to access a private permissioned function once the device has left the facility property or disconnects from the facility Wi-Fi network. The bad actor may be prevented from enacting inappropriate transactions for a particular resource via an executive review process of transactions, or a time expiration that is reached before transactions can be enacted. If the bad actor obtains a particular recipient device, the device obtained may not be authorized to access the application of interest to the bad actor, or may also require possession of a specific keystore to access the application. The necessity of acquiring more than one device from the enterprise (furthermore, acquiring the proper combination of devices) substantially reduces the likelihood of breach success. Additionally, both user credentials and access credentials may be revoked at any time by the administrator using either an administrative private key or the smart contract private key, such that an outdated or compromised credential can be erased without unnecessarily erasing unaffected users or devices.

Decentralized Access Delegation Workflows

Within the disclosed system, a broad variety of implementation components and possible permutations have been introduced in an isolated context. FIGS. 5-8 involve detailed example workflows combining the various system components previously introduced in a cohesive process for a plurality of potential embodiments.

Figure 5:
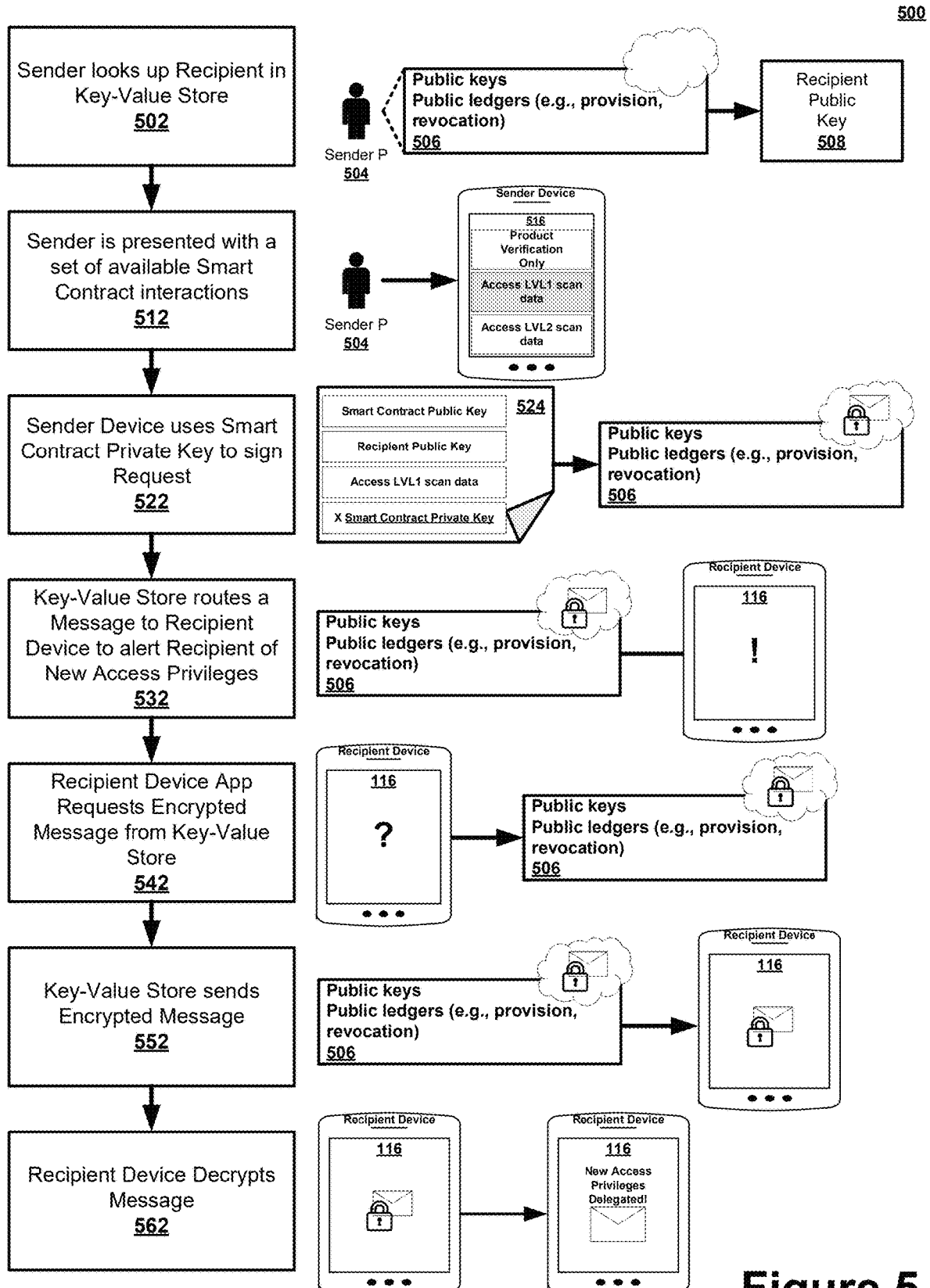
FIG. 5 shows a flow diagram for conditional access delegation leveraging self-sovereign credentials held on mobile devices to generate smart contracts.

FIG. 5 shows a flow diagram 500 for conditional access delegation leveraging self-sovereign credentials held on mobile devices to generate smart contracts. In step 502, a sender P 504 (where sender P may be an administrator such as administrator 102 managing enterprise identity and access control, a supervisor delegating privileges to a direct report, a worker delegating temporary privileges to a substitute worker during a leave period, or an external trusted source delegating access to a particular user following an earned certification or registration) first looks up the desired recipient in a key-value store such as cloud-based server 506. As previously described, alternative methods are disclosed for scenarios in which the desired recipient has not been provisioned user credentials accessible within the key-value store 202 involving close-range communication with a provisioned device to be accessed by the desired recipient. However, in scenarios where the desired recipient has previously been issued user credentials stored within cloud-based server 506, sender P 504 may obtain the recipient public key 508.

In step 512, sender P 504 is presented with a set of available smart contract interactions. The smart contract interactions presented may include a comprehensive set of all smart contract interactions defined for the enterprise, a specific subset of smart contract interactions allowable for a particular task or function, or a specific subset of smart contract interactions allowable for a particular recipient as informed by the recipient's role or qualifications. In the shown example, sender P 504 uses a sender device 516 to generate the smart contract and may select options such as "Product Verification Only", "Access LVL1 scan data", or "Access LVL2 scan data" to limit conditional access for a recipient. When generating the smart contract, sender P 504 will also generate a smart contract public key and a smart contract private key.

In step 522, sender P 504 generates the access credential 524 for the recipient, using the smart contract private key to sign the request. Access credential 524, containing the smart contract public key, recipient public key, and smart contract with associated conditions, will be encrypted using the smart contract private key and transmitted to the cloud-based server 506 via ECDH and DIDComm encryption protocols. The key-value store within cloud-based server 506 can route a message to recipient device 116 to alert the recipient of new access privileges in step 532. In some implementations, the recipient may need to be authenticated into an application using their user credential prior to receiving the alert of any new delegated access. Alternatively, the recipient may also initiate a check for new access privileges via an authentication method such as close-range communication with a badge ID, input of a password, or a biometric input.

In step 542, an application on recipient device 116 requests the encrypted message from the key-value store within cloud-based server 506 using the recipient public key, which is derived from the recipient private key using a elliptic curve cryptography function as previously described. The recipient private key may be stored locally on recipient device 116, or it may be read off a separate recipient keystore via close-range communication methods. The key-value store within cloud-based server 506 responds in step 552 by sending the encrypted credential to recipient device 116. In final step 562, recipient device 116 decrypts the encrypted message using the recipient private device, enabling the recipient to use the decrypted access credential for authentication to access one or more private permissioned resources to which the recipient has been delegated access.

Figure 6:
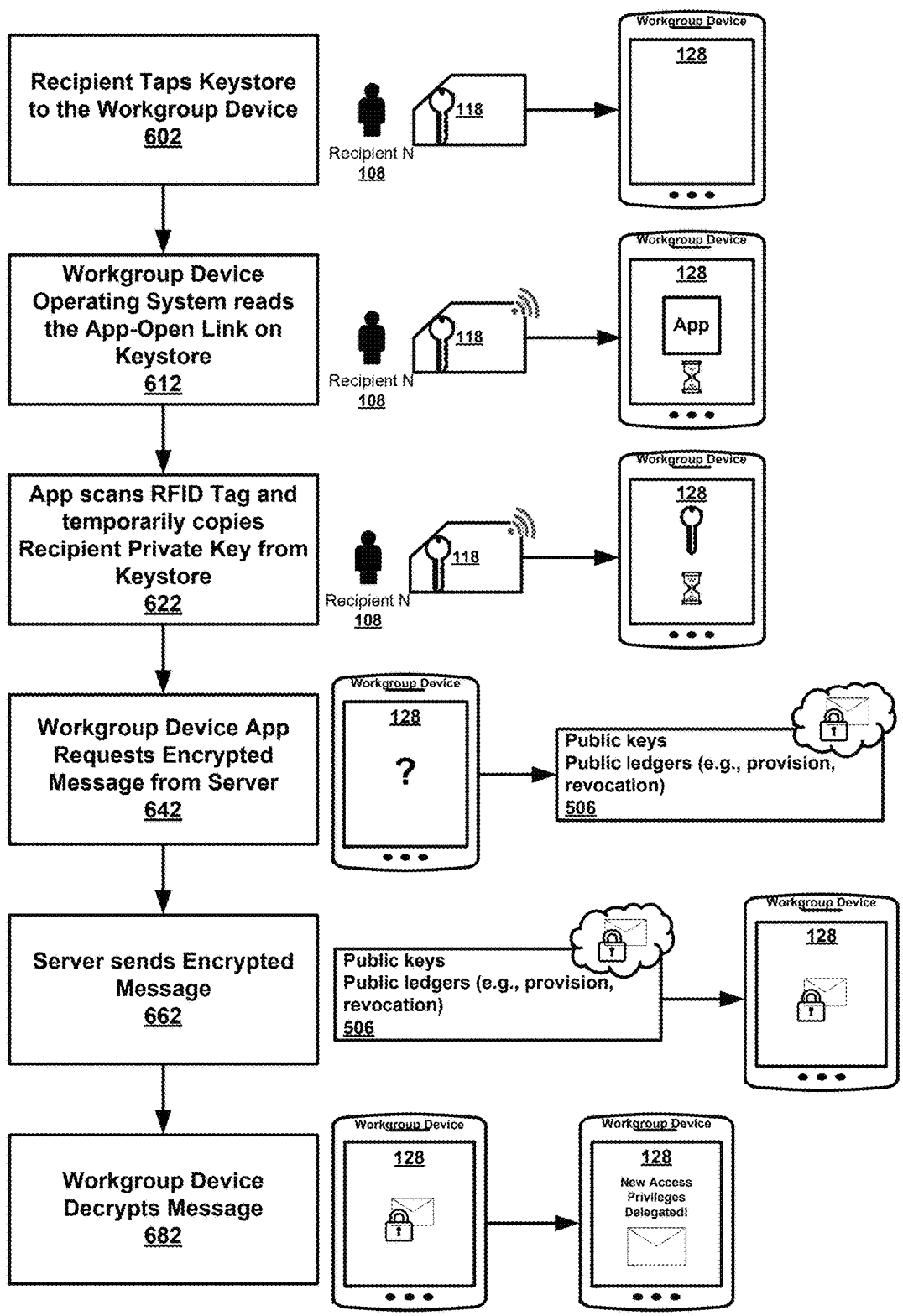
FIG. 6 shows a flow diagram for recipient authentication leveraging a private key stored on a keystore read by a multi-tenant provisioned device.
Figure 7:
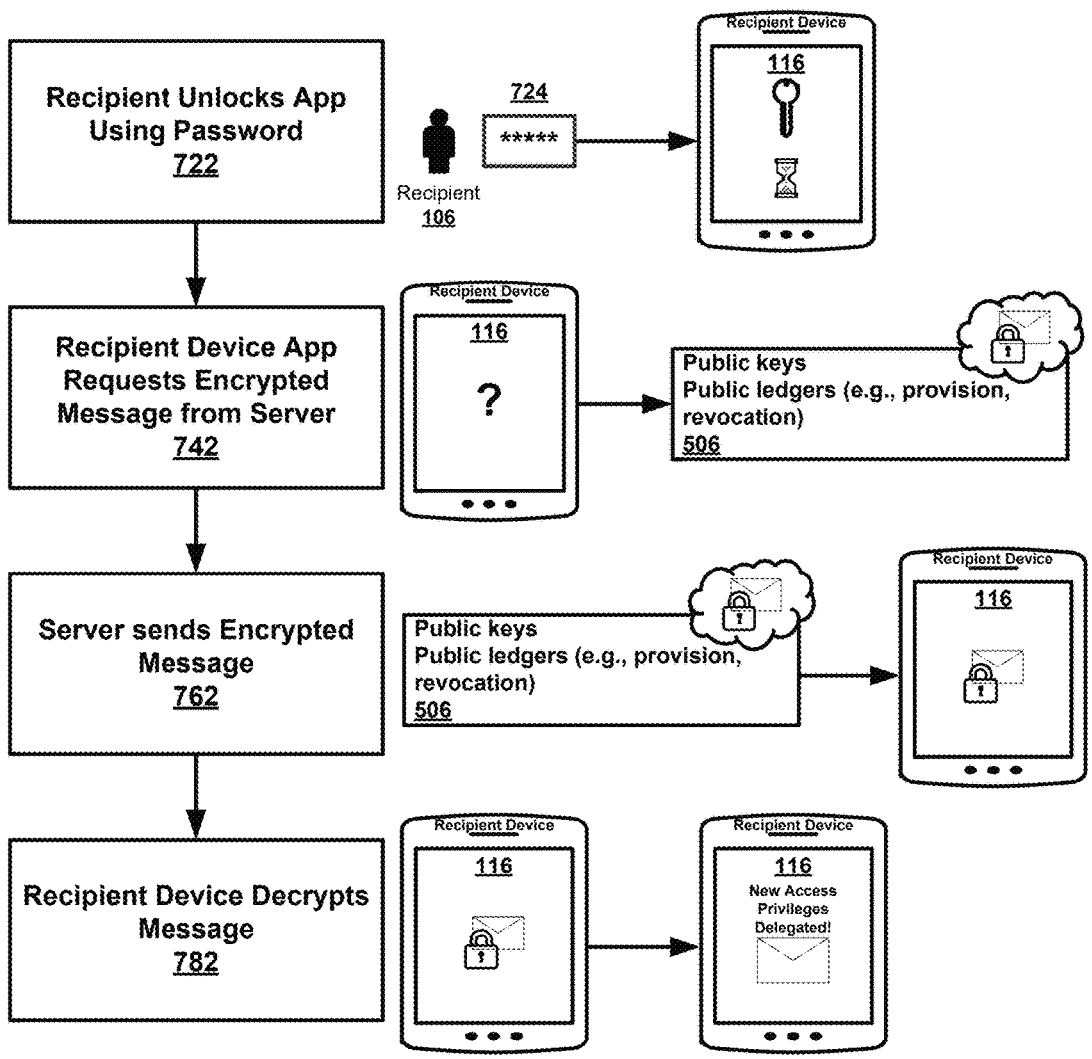
FIG. 7 shows a flow diagram for recipient authentication leveraging a private key stored on a single-tenant provisioned device.
Figure 8:
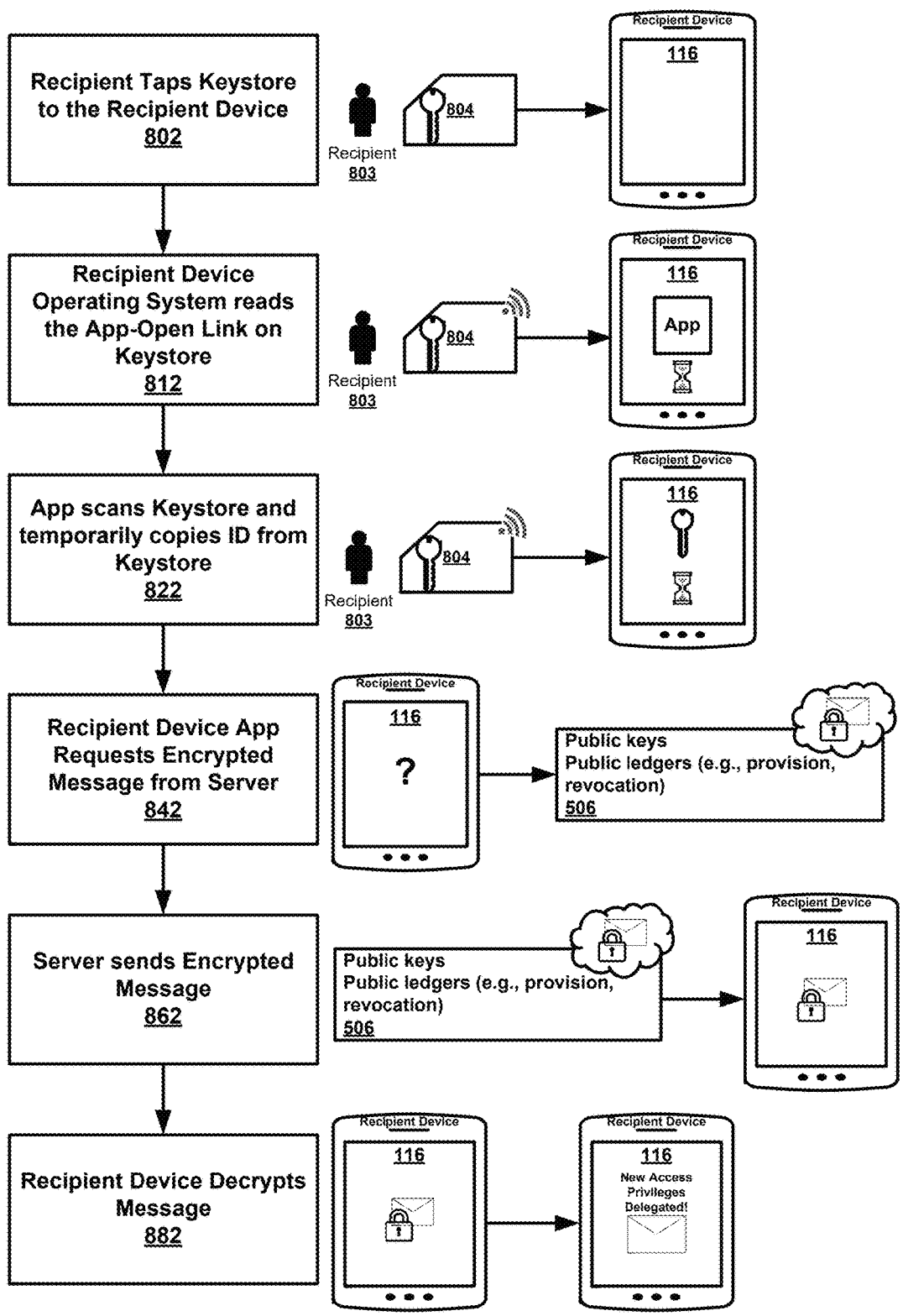
FIG. 8 shows a flow diagram for recipient authentication leveraging a private key stored on a keystore read by a single-tenant provisioned device.

Next, FIGS. 6 through 8 provide examples of the access delegation system from the perspective of the recipient seeking authentication into a particular application on a mobile device.

FIG. 6 shows a flow diagram 600 for recipient authentication leveraging a private key stored on a keystore read by a multi-tenant provisioned device. FIG. 6 assumes that an administrator or other sender has already generated an access credential for Recipient N 108 and the encrypted access credential is stored in a key-value store within cloud-based server 506, indexed by the user public key of Recipient N 108. In step 602, Recipient N 108 taps keystore 118 to workgroup device 128. As a result of the communication with keystore 118, in step 612, workgroup device 128 reads an application-opening ("app-open") link on keystore 118.

In step 622, workgroup device 128 also obtains the identity for Recipient N 108 by temporarily copying the recipient private key to device storage so that the recipient private key can be used to authenticate Recipient N 108 to access the application opened by the app-open link. However, Recipient N 108 must first access and decrypt the newly delegated access credential before they can perform successful authentication. Thus, workgroup device 128 uses an elliptic curve cryptography function to obtain the recipient public key from the recipient private key so that in step 642, workgroup device 128 can query the key-value store within cloud-based server 506 by the recipient public key and requests the encrypted access credential from the key-value store. In step 662, the cloud-based server 506 sends the encrypted message to the workgroup device 128. In final step 682, workgroup device 128 decrypts the encrypted message, obtaining the necessary access credential.

Similar workflows exist for recipients seeking authentication using a single-tenant recipient device 116. For added security, a variety of multi-factor authentication methods may be implemented for the user to unlock an application, preventing a bad actor from automatically receiving access to the recipient private key by obtaining recipient device 116.

FIG. 7 shows a flow diagram for recipient authentication leveraging a private key stored on a single-tenant provisioned device. As in FIG. 6, FIG. 7 assumes that an administrator or other sender has already generated an access credential for recipient 106 and the encrypted access credential is stored in a key-value store within cloud-based server 506, indexed by the user public key of recipient 106. In step 722, recipient 106 unlocks an application on recipient device 116 using password 724. Password 724 may be a passcode, password, security question, biometric such as facial recognition or fingerprint recognition, or a combination of two or more of the above. By unlocking the application, recipient device 116 is able to access the recipient private key and use it to obtain the recipient public key.

In step 642, recipient device 116 queries the key-value store within cloud-based server 506 by the recipient public key and requests the encrypted access credential from the key-value store. In step 762, the cloud-based server 506 sends the encrypted message to the recipient device 116. In final step 782, recipient device 116 decrypts the encrypted message, obtaining the necessary access credential.

Some implementations of the system disclosed may combine various features from the workflows described herein. While many combinations and permutations of the authentication protocol disclosed exist, a single example is given below.

FIG. 8 shows a flow diagram for recipient authentication leveraging a private key stored on a keystore read by a single-tenant provisioned device. As in FIG. 6 and FIG. 7, FIG. 8 assumes that an administrator or other sender has already generated an access credential for recipient 803 and the encrypted access credential is stored in a key-value store within cloud-based server 506, indexed by the user public key of recipient 803. In step 802, recipient 803 taps keystore 804 to recipient device 116. As a result of the communication with keystore 804, in step 812, recipient device 116 reads an application-opening ("app-open") link on keystore 804.

In step 822, recipient device 116 also obtains the identity for recipient 803 by temporarily copying the recipient private key to device storage so that the recipient private key can be used to authenticate recipient 803 to access the application opened by the app-open link. However, recipient 803 must first access and decrypt the newly delegated access credential before they can perform successful authentication. Thus, recipient device 116 uses an elliptic curve cryptography function to obtain the recipient public key from the recipient private key so that in step 842, recipient device 116 can query the key-value store within cloud-based server 506 by the recipient public key and requests the encrypted access credential from the key-value store. In step 862, the cloud-based server 506 sends the encrypted message to the recipient device 116. In final step 882, recipient device 116 decrypts the encrypted message, obtaining the necessary access credential.

Privacy Protection Measures

The disclosed system implements a variety of privacy protection measures that will now be summarized to emphasize the tactics by which security risks are minimized. Private keys for all users are always stored locally on mobile devices, and private keys of separate users are sequestered on separate respective devices (i.e., individual recipients either use their own respective recipient device, or in the event that multiple recipients use a shared workgroup device, recipient private keys are stored in a separate keystore and the recipient private key is always erased from the workgroup device following authentication). Because each transaction and interaction with decentralized network 164 is directly tied to a particular user credential, and there is a detailed ledger of any access delegation transactions related to a particular action, each action may be clearly traced back to the specific responsible user.

The plurality of smart contract conditions implemented to limit conditional access delegation to recipients are structured such that access is frequently delegated through an evanescent credential and in the event that an access credential is invalidated or expires, any evidence supporting the recipient at expiry is automatically deleted. In addition to a number of conditional access limitations enacted by smart contracts, access is always revocable in a straightforward process where the administrator uses their own credentials or smart contract credentials to revoke the access credential. A transaction ledger comprises a record of all issuance, provisioning, delegation, and revocation transactions for the maintenance of integrity.

In many implementations of the technology disclosed, systems 100A and 100B have access to one or more external servers corresponding to trusted sources (e.g., government organizations or credentialing agencies) for verification of a recipient's qualifications or clearance level prior to delegating access to a private permissioned function within the enterprise operations. In certain implementations of the technology disclosed, verification and modification logics are configured to verify that a change in user status or privileges is appropriate and enact the proper modification to distributed network 164. Some implementations further include a machine learning classifier trained to detect if a change in user status or privileges is warranted or if a change in user status or privileges is suspected for malicious or inappropriate access.

Enterprises may implement many levels of multi-factor authentication for their users prior to accessing sensitive information or resources. To access a particular application, data source, function, or resource, a user may require the use of two separate items: a mobile device and an additional keystore storing the user's private key. Moreover, one or both of these hardware devices may be configured to exclusively function at a particular location or while connected to a particular network. If a hardware device does not meet these requirements (or any qualifying event occurs resulting in an administrator desiring to restrict access to the device of concern), the device may refuse all authentication attempts or become "bricked" so that it is no longer functional.

A user may also require input of a passcode or biometric prior to authentication into an application. A user device may require close-range communication with a location-specific or administrator-managed hardware device prior to authentication. Any or all of the described authentication methods may be required in a multi-factor authentication process. For example, a user may use facial recognition to unlock a provisioned device, triggering the provisioned device to request communication with a keystore that contains the user private key. For further security, a user may also have to input a passcode to initiate recipient public key generation once the device has obtained a user private key. A user skilled in the art will be familiar with the variety of multi-factor authentication permutations that may be applied to the disclosed system. Devices may also be configured to automatically log a user out or erase any sensitive user information and therefore require re-authentication after a certain pre-determined period of time where the device is idle. If a user fails to successfully complete authentication a pre-determined number of attempts, the user credentials, device credentials, or both sets of credentials may be locked out pending review by an administrator.

For additional regulation of IAM systems, enterprises may also provision user credentials to one or more "super-administrators" responsible for the management of administrative credentials for one or more administrators. As a result of the decentralized structure of the disclosed system, it is simple to lock out a specific user, revoke the user's access credentials, or revoke the user credential entirely without affecting the access of unrelated devices and users. By means of locally-sequestered, self-sovereign user credentials, a breach of the key-value store would not allow a bad actor to impersonate any existing user within the database or directory. In the event that a bad actor obtains the necessary technology to impersonate a particular user and successfully authenticate into the user's access privileges for a period of time before an administrator is able to perform necessary revocations to control the risk, the bad actor will be limited to the particular user's access privileges and associated conditions imposed upon the delegated access (i.e., access to one user's information does not provide a route to access of another user's information, regardless of the breached user account's administrative status or clearance level).

As a result of the described precautions, the disclosed system is resistant to explosion of access rights, under-the-radar outdated access privileges, uncontrolled data leak events, and other sources of inappropriate authentication.

Graphical User Interface

Figure 9:
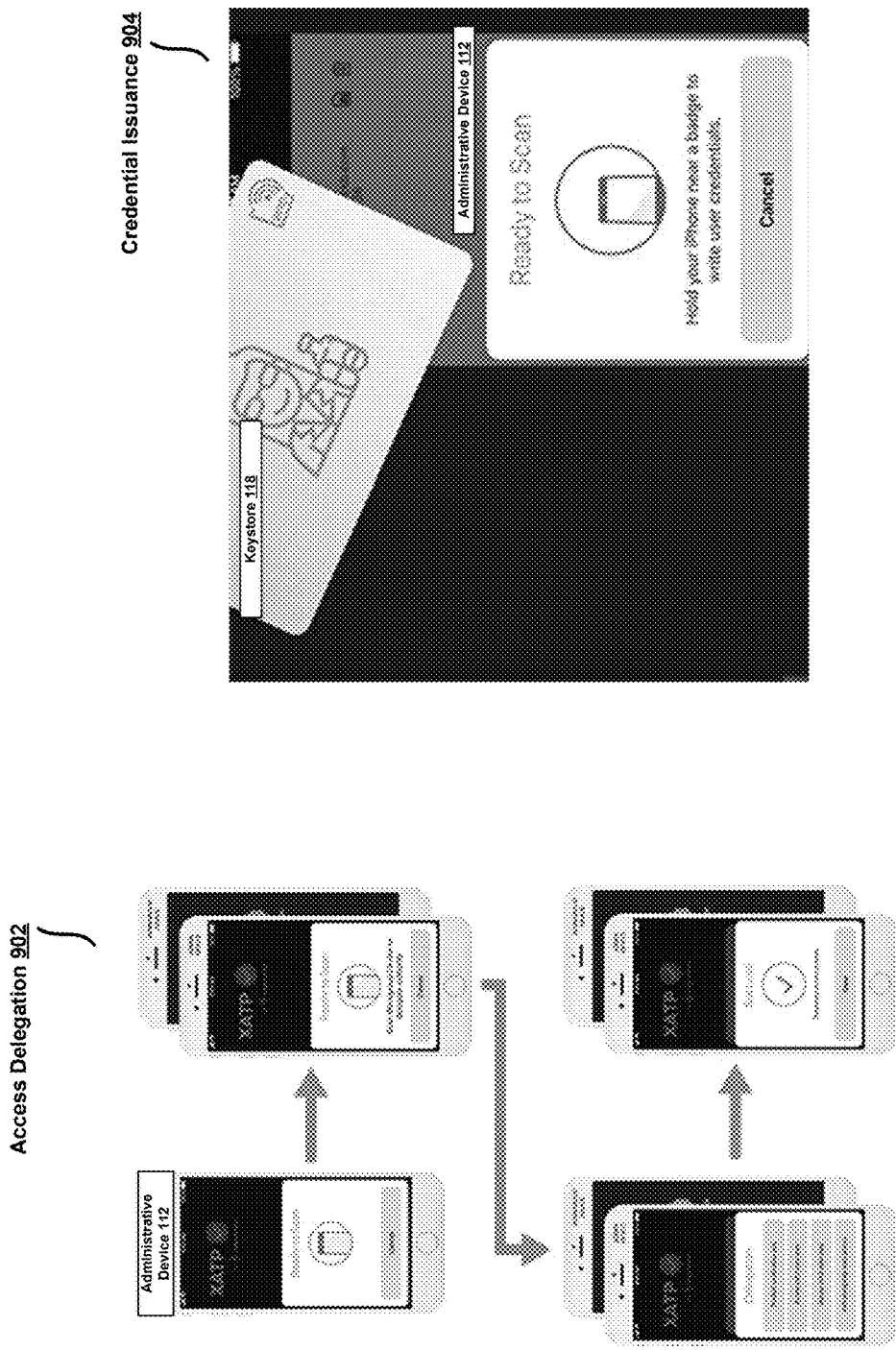
FIG. 9 illustrates a graphical user interface that can be implemented for the technology disclosed.

FIG. 9 illustrates a graphical user interface that can be implemented for the technology disclosed. Access delegation schematic 902 illustrates administrative device 112 displaying a user interface for a XATP application that is waiting to receive local communication of a hardware device, such as a workgroup device, to delegate particular privileges to be accessible when using the workgroup device. The workgroup device will be delegated access privileges as determined by the smart contract conditions selected by the administrator. Upon successful smart contract generation and delegation of access rights, a success message is presented towards the administrator.

Credential issuance schematic 904 illustrates a similar procedure to that shown in schematic 902; however, in schematic 904, the administrative device 112 is being used to issue user credentials to a desired recipient. The desired recipient has a uniquely-identifiable RFID badge 118 to be scanned by administrative device 112 via a tap or similar action, resulting in a user private key being written to keystore 118 that can be used to access the recipient's user credential on a key-value store.

Computer System

Figure 10:
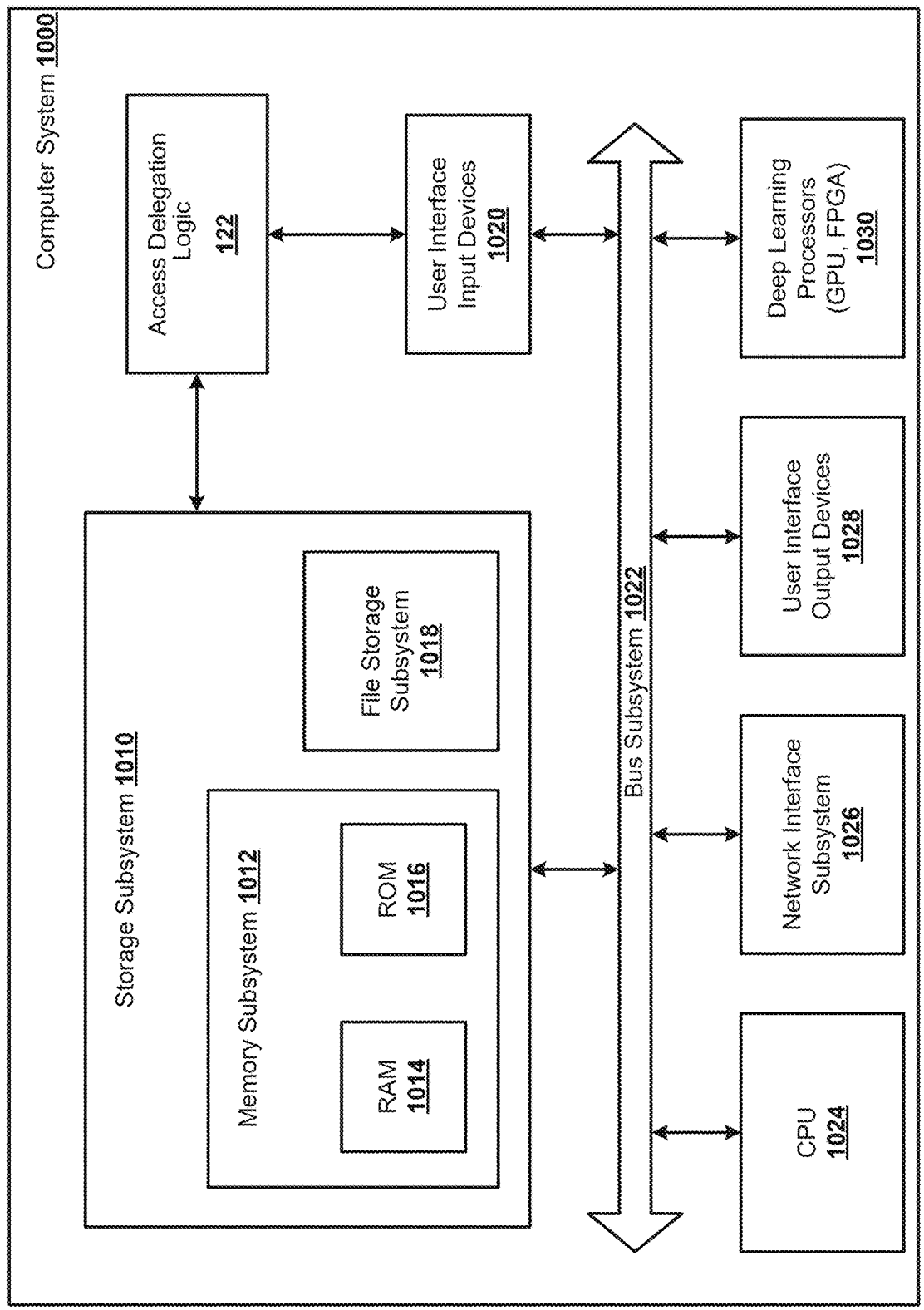
FIG. 10 shows an example computer system that can be used to implement the technology disclosed.

FIG. 10 is a simplified block diagram of a computer system 1000 that can be used for leveraging self-sovereign credentials held on mobile devices to generate smart contracts that empower one party to obtain credentialed access to information and resources on behalf of another party, without either party exposing private key information to each other or to the cloud. Computer system 1000 includes at least one central processing unit (CPU) 1024 that communicates with a number of peripheral devices via bus subsystem 1022, and Access Delegation Logic 122, as described herein. These peripheral devices can include a storage subsystem 1010 including, for example, memory devices and a file storage subsystem 1018, user interface input devices 1020 user interface output devices 1028, and a network interface subsystem 1026. The input and output devices allow user interaction with computer system 1000. Network interface subsystem 1026 provides an interface to outside networks, including an interface to corresponding interface devices in other computer systems. Access Delegation Logic 122 is communicably linked to the storage subsystem 1010 and the user interface input devices 1020.

User interface input devices 1020 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1028 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1010 can be graphics processing units (GPUs) or field-programmable gate arrays (FPGAs).

Memory subsystem 1012 used in the storage subsystem 1010 can include a number of memories including a main random-access memory (RAM) 1016 for storage of instructions and data during program execution and a read only memory (ROM) 1016 in which fixed instructions are stored. A file storage subsystem 1018 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1018 in the storage subsystem 1010, or in other machines accessible by the processor.

Bus subsystem 1022 provides a mechanism for letting the various components and subsystems of computer system 1000 communicate with each other as intended. Although bus subsystem 1022 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely distributed set of loosely networked computers, or any other data processing system or user device. Due to the ever changing nature of computers and networks, the description of computer system 1000 depicted in FIG. 10 is intended only as a specific example for purposes of illustrating the preferred embodiments of the present invention. Many other configurations of computer system 1000 are possible having more or fewer components than the computer system depicted in FIG. 10.

Particular Implementations

We describe some implementations and features for leveraging self-sovereign credentials held on mobile devices to generate smart contracts that empower one party to obtain credentialed access to information and resources on behalf of another party, without either party exposing private key information to each other or to the cloud.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One implementation discloses a method for delegating user access to one of a set of decentralized networked nodes that share a private permissioned blockchain data structure or a decentralized personal ledger. The method also includes a credentialing logic configured to receive from one of a set of decentralized networked nodes, authority to access a network node to invoke services that conduct operations using a private permissioned blockchain data structure or decentralized personal ledger to which access has been limited to users authorized by one of the set of decentralized networked nodes; and an access delegation logic configured to create a delegation of at least some of the authority to access the network node for a limited duration of time and to send the delegation to a recipient identified to receive delegated authority.

The credentialing logic is further configured to store a user private key to invoke the services in a keystore of a user. The access delegation logic further includes a conditional access definition logic configured to generate a smart contract, a smart contract private key and a smart contract public key, and store a user private key to invoke services in a keystore of a user. The access delegation logic further includes an access credential generation logic to generate an access credential for the recipient, where the access credential includes a recipient public key of the recipient, the smart contract public key, and the smart contract. The access delegation logic further includes an access credential encryption logic configured to encrypt the access credential using the smart contract private key, and generate an encrypted access credential. The access delegation logic further includes an access credential deployment logic configured to deploy the encrypted access credential such that the encrypted access credential is: (i) retrievable by the recipient using the recipient public key, (ii) decryptable by the recipient using a recipient private key, and (iii) revocable using the smart contract private key. Other embodiments of this aspect include corresponding computer methods, apparatus, and computer programs recorded on one or more computer storage devices, each configured to perform the actions of the method. Implementations may include one or more of the following features.

In some implementations, the access delegation logic runs on an administrative device but the credentialing logic runs on a separate device, whereas other implementations include both the access delegation logic and the credentialing logic running on the administrative device.

Many implementations of the method further include the delegation of some of the authority to access the network node for a limited duration of time via use of an evanescent credential; and where the access delegation logic is further configured to configure an automatic deletion of any evidence supporting identifying the recipient at expiry of the duration of time.

In some implementations, the method further includes a recipient being connected via a recipient device, wherein the recipient device may be implemented in a variety of forms. In one implementation, the recipient device is a workgroup device configured to authenticate a plurality of recipients in a workgroup. In another implementation, the recipient device is a recipient device in a plurality of recipient devices, where respective recipient devices in the plurality of recipient devices are configured to authenticate respective recipients in the plurality of recipients.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

One implementation of the method further includes the access delegation logic configured to function as follows. The access delegation logic may be further configured to retrieve the recipient public key from a key-value store. In other implementations, the access delegation logic may be further configured to retrieve the recipient public key from a method of close-range communication with a provisioned recipient device or keystore. The key-value store hosts respective recipient public keys of the respective recipients. The access credential deployment logic may be further configured to transmit the encrypted access credential to the key-value store. The encrypted access credential can be indexed on the key-value store by the recipient public key. The access credential deployment logic can be further configured to transmit the encrypted access credential to a DIDComm inbox of a recipient on the key-value store. Based on the recipient public key, the recipient device receives a message from the key-value store that notifies the recipient that the encrypted access credential with the delegation is available.

In some implementations of the method, logics for the receival and decryption of an access credential by a recipient or workgroup device are configured as follows. A recipient public key generation logic, running on the recipient device, is configured to generate the recipient public key based on the recipient private key. The recipient public key generation logic is further configured to use an elliptic curve cryptography function to generate the recipient public key based on the recipient private key. The recipient private key is stored only on the recipient device. An access credential retrieval logic, running on the recipient device, is configured to use the recipient public key to query the key-value store for the encrypted access credential, and, in response, receive the encrypted access credential from the key-value store. The access credential retrieval logic is further configured to use an authentication token of the recipient device to access the key-value store. The access credential retrieval logic is further configured to receive, using DIDComm messaging protocol and ECDH key exchange, the encrypted access credential from the key-value store. An access credential decryption logic, running on the recipient device, is configured to decrypt the encrypted access credential using the recipient private key, and generate a decrypted access credential. An authentication logic, running on the recipient device, is configured to authenticate the recipient using the decrypted access credential. The recipient seeks authentication to a particular application running on the recipient device. The authentication logic is further configured to authenticate the recipient into the particular application using the decrypted access credential. In some implementations of the disclosed technology, the recipient may be seeking authentication to a particular database or other data storage structure, physical or digital resource, or blockchain-based framework.

Other implementations of the technology disclosed further include a key-value store, which may be a distributed network, a blockchain network, or a database.

Other implementations of the method further include a smart contract generated in response to a selection of a conditional access delegation option in a plurality of conditional access delegation options. The smart contract private key is stored only on the administrative device. The access credential can be encrypted using a decentralized identity communication (DIDComm) messaging protocol. The DIDComm messaging protocol uses the smart contract private key as a sender and the recipient public key as a recipient, and generates the encrypted access credential as a shared secret by executing an Elliptic Curve Diffie-Hellman (ECDH) key exchange. The smart contract private key may be an ephemeral key. The access delegation logic can be further configured to revoke the conditional access delegated to the recipient by writing to a revocation ledger using the smart contract private key.

In some implementations of the technology disclosed, the access delegation logic is further configured to receive the recipient public key from the recipient device in response to the recipient device and the administrative device coming within a proximity range or tapping against each other.

One general aspect includes a method for access delegation. The method also includes an access delegation logic configured to delegate conditional access to recipients of the conditional access using user controlled private keys that bypass server-side transmission channels, may include: a conditional access definition logic configured to generate a smart contract that sets parameters for conditional access delegated to a recipient, and generate a smart contract public key and a smart contract private key for the smart contract; an access credential generation logic configured to generate an access credential for the recipient, where the access credential includes a recipient public key of the recipient, the smart contract public key, and the smart contract; an access credential encryption logic configured to encrypt the access credential using the smart contract private key, and generate an encrypted access credential. The method also includes an access credential deployment logic configured to deploy the encrypted access credential. Other embodiments of this aspect include corresponding computer methods, apparatus, and computer programs recorded on one or more computer storage devices, each configured to perform the actions of the method.

One general aspect includes a method for access delegation. The method also includes an access delegation logic configured to delegate conditional access to recipients using private keys that bypass server-side transmission channels, may include: a conditional access definition logic configured to generate a smart contract that sets parameters for conditional access delegated to a recipient, and to generate a smart contract public key and a smart contract private key for the smart contract; an access credential generation logic configured to generate an access credential for the recipient, where the access credential includes a recipient public key of the recipient, the smart contract public key, and the smart contract; an access credential encryption logic configured to encrypt the access credential using the smart contract private key, and generate an encrypted access credential; and an access credential deployment logic configured to deploy the encrypted access credential such that the encrypted access credential is retrievable by the recipient using the recipient public key, decryptable by the recipient using a recipient private key, and revocable using the smart contract private key. Other embodiments of this aspect include corresponding computer methods, apparatus, and computer programs recorded on one or more computer storage devices, each configured to perform the actions of the method.

Implementations of the described techniques may include hardware, a method or process, or computer software on a computer-accessible medium.

Other implementations of the disclosed technology described in this section can include a tangible non-transitory computer-readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A method for delegating user access to one of a set of decentralized networked nodes that share a private permissioned blockchain data structure or a decentralized personal ledger, to which access has been limited to users authorized by one of the set of decentralized networked nodes, the method comprising:
   receiving from one of the set of decentralized networked nodes, an authority to access a network node to invoke services that conduct operations using the private permissioned blockchain data structure or decentralized personal ledger;
   creating a delegation of at least some of the authority to access the network node using a decentralized identity communication (DIDComm) messaging protocol, generating an encrypted access credential, wherein DIDComm messaging protocol uses a private key as a sender and a recipient public key as a recipient, and generates the encrypted access credential; and
   sending the delegation to the recipient.

2. The method of claim 1, wherein a delegation of some of the authority to access the network node for a limited duration of time comprises an evanescent credential; and wherein creating a delegation further includes configuring an automatic deletion of any evidence supporting identifying the recipient at expiry of the limited duration of time.

3. The method of claim 1, further including storing in a keystore of a user, a user private key to invoke the services.

4. The method of claim 1, wherein creating a delegation further includes defining a conditional access by generating a smart contract, a smart contract private key and a smart contract public key, and storing in a keystore of a user, a user private key to invoke services.

5. The method of claim 4, wherein creating a delegation further includes generating an access credential for the recipient, wherein the access credential includes the recipient public key of the recipient, the smart contract public key, and the smart contract.

6. The method of claim 5, wherein the DIDComm messaging protocol uses the smart contract private key as the private key of the sender generates the encrypted access credential as a shared secret by executing an Elliptic Curve Diffie-Hellman (ECDH) key exchange.

7. The method of claim 6, further including deploying the encrypted access credential such that the encrypted access credential is: (i) retrievable by the recipient using the recipient public key, (ii) decryptable by the recipient using a recipient private key, and (iii) revocable using the smart contract private key.

8. The method of claim 7, wherein deploying the encrypted access credential is performed by an administrative device and, wherein the recipient is connected via a recipient device, wherein the recipient device is one selected from (i) a workgroup device configured to authenticate a plurality of recipients in a workgroup, and (ii) a recipient device in a plurality of recipient devices, wherein respective recipient devices in the plurality of recipient devices are configured to authenticate respective recipients in the plurality of recipients.

9. The method of claim 8, further including: retrieving the recipient public key from a key-value store, wherein the key-value store hosts respective recipient public keys of the respective recipients, and wherein the key-value store is one of: (i) a decentralized network; (ii) a decentralized blockchain network; and (iii) a database.

10. The method of claim 8, wherein the smart contract private key is stored only on the administrative device.

11. The method of claim 9, further including implementing one or more of: (i) transmitting the encrypted access credential to the key-value store; (ii) indexing the encrypted access credential on the key-value store by the recipient public key; and (iii) transmitting the encrypted access credential to a DIDComm inbox of a recipient on the key-value store, and wherein, based on the recipient public key, the recipient device receives a message from the key-value store that notifies the recipient that the encrypted access credential with the delegation is available.

12. The method of claim 9, further including:
generating by the recipient device, the recipient public key based on the recipient private key using an elliptic curve cryptography function to generate the recipient public key based on the recipient private key;
wherein the recipient private key is stored only on the recipient device; and
using by the recipient device the recipient public key to query the key-value store for the encrypted access credential, and, in response, receiving the encrypted access credential from the key-value store.

13. The method of claim 12, further including using an authentication token of the recipient device to access the key-value store.

14. The method of claim 12, further including receiving, using DIDComm messaging protocol and ECDH key exchange, the encrypted access credential from the key-value store.

15. The method of claim 12, wherein an access credential decryption logic, running on the recipient device, is configured to: (i) decrypt the encrypted access credential using the recipient private key, and generate a decrypted access credential; (ii) to authenticate using an authentication logic, a recipient using the decrypted access credential; and (iii) if the recipient seeks authentication to a particular application running on the recipient device, to authenticate the recipient into the particular application using the decrypted access credential.

16. The method of claim 4, wherein the smart contract private key is an ephemeral key.

17. The method of claim 4, further including revoking the conditional access delegated to the recipient by writing to a revocation ledger using the smart contract private key.

18. The method of claim 8, further including receiving the recipient public key from the recipient device in response to one of: (i) the recipient device and the administrative device coming within a proximity range, and (ii) the recipient device and the administrative device tapping against each other.

19. The method of claim 1, further including delegate conditional access to recipients using private keys that bypass server-side transmission channels, comprising:
generating by a conditional access definition logic, a smart contract that sets parameters for conditional access delegated to a recipient, and generating a smart contract public key and a smart contract private key for the smart contract;
generating by an access credential generation logic, an access credential for the recipient, wherein the access credential includes the recipient public key of the recipient, the smart contract public key, and the smart contract;
encrypting by an access credential encryption logic, the access credential using the smart contract private key, and generating an encrypted access credential; and
deploying by an access credential deployment logic, the encrypted access credential such that the encrypted access credential is:
retrievable by the recipient using the recipient public key,
decryptable by the recipient using a recipient private key, and
revocable using the smart contract private key.

20. A system comprising one or more processors coupled to memory storing instructions for delegating user access to one of a set of decentralized networked nodes that share a private permissioned blockchain data structure or a decentralized personal ledger, to which access has been limited to users authorized by one of the set of decentralized networked nodes, which instructions when executed by the one or more processors, implement:
receiving from one of the set of decentralized networked nodes, an authority to access a network node to invoke services that conduct operations using the private permissioned blockchain data structure or decentralized personal ledger to which access has been limited to users authorized by one of the set of decentralized networked nodes; and
creating a delegation of at least some of the authority to access the network node for a limited duration of time, wherein a user private key is stored in a keystore of a user to invoke the services; and
sending the delegation to a recipient.

21. A non-transitory computer readable medium storing instructions for delegating user access to one of a set of decentralized networked nodes that share a private permissioned blockchain data structure or a decentralized personal ledger, to which access has been limited to users authorized by one of the set of decentralized networked nodes, which instructions when executed by one or more processors perform operations comprising:
receiving from one of the set of decentralized networked nodes, an authority to access a network node to invoke services that conduct operations using the private permissioned blockchain data structure or decentralized personal ledger to which access has been limited to users authorized by one of the set of decentralized networked nodes;

creating a delegation of at least some of the authority to access the network node for a limited duration of time, wherein a user private key is stored in a keystore of a user to invoke the services; and sending the delegation to a recipient.

* * * * *